US009182707B2

(12) United States Patent
Morihara et al.

(10) Patent No.: US 9,182,707 B2
(45) Date of Patent: Nov. 10, 2015

(54) IMAGE FORMING APPARATUS

(71) Applicant: CANON KABUSHIKI KAISHA, Tokyo (JP)

(72) Inventors: Ryo Morihara, Tokyo (JP); Takao Kume, Yokohama (JP); Toshihiko Takayama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/259,195

(22) Filed: Apr. 23, 2014

(65) Prior Publication Data

US 2014/0314431 A1 Oct. 23, 2014

(30) Foreign Application Priority Data

Apr. 23, 2013 (JP) ................................ 2013-090559
Jul. 12, 2013 (JP) ................................ 2013-146907

(51) Int. Cl.

*G03B 15/00* (2006.01)
*G03G 15/16* (2006.01)
*G03G 15/01* (2006.01)

(52) U.S. Cl.

CPC ........ *G03G 15/1615* (2013.01); *G03G 15/0136* (2013.01)

(58) Field of Classification Search

USPC ........................................................... 399/46
See application file for complete search history.

(56) References Cited

U.S. PATENT DOCUMENTS

| | | | | |
|---|---|---|---|---|
| 5,032,904 | A * | 7/1991 | Murai et al. | 358/500 |
| 7,949,269 | B2 * | 5/2011 | Takeuchi | 399/46 |
| 8,219,004 | B2 * | 7/2012 | Mochizuki et al. | 399/167 |
| 2011/0158666 | A1 * | 6/2011 | Furukawa | 399/46 |
| 2013/0272759 | A1 * | 10/2013 | Takada et al. | 399/329 |

FOREIGN PATENT DOCUMENTS

| | | | |
|---|---|---|---|
| JP | 2001-249519 | A | 9/2001 |
| JP | 2003-076103 | A | 3/2003 |
| JP | 2008-282043 | A | 11/2008 |

* cited by examiner

*Primary Examiner* — Clayton E LaBalle
*Assistant Examiner* — Warren K Fenwick
(74) *Attorney, Agent, or Firm* — Fitzpatrick, Cella, Harper & Scinto

(57) ABSTRACT

An image forming apparatus includes image bearing members, cleaning blades for removing toner from corresponding image bearing members, and developing devices for developing an electrostatic latent image on corresponding image bearing members with toner. The image forming apparatus is operable in a monochromatic mode in which the toner image is formed only on a predetermined one of the image bearing members, and no image is formed on the other image bearing member. In a monochromatic mode operation, a controller starts to drive the plurality of image bearing members in synchronism with each other in a state that the other image bearing member is spaced from a belt and the predetermined image bearing member is in contact with the belt. The controller is capable of executing a supplying operation for supplying the toner from the developing devices to the cleaning blades by way of the image bearing members, respectively.

20 Claims, 11 Drawing Sheets

IMAGE FORMING APPARATUS

FIELD OF THE INVENTION AND RELATED ART

The present invention relates to an image forming apparatus such as a copying machine, a printer, a facsimile machine, which uses an electrophotographic, electrostatic, or the like image forming method.

There have been available various types of image forming apparatus. Some of them are referred to as image forming apparatuses of the tandem type (inline type), which are equipped with multiple image forming portions having a photosensitive drum as an image bearing member, and being different in the color of the image they form. Further, image forming apparatuses of the so-called tandem type can be classified into image forming apparatuses of the intermediary transfer type and image forming apparatuses of the direct transfer type. An image forming apparatus of the inline type, which employs an intermediary transferring member, forms toner images in layers (primary transfer) and transfers the toner images onto its intermediary transferring member such as an intermediary transfer belt, in its primary transferring portion, and then, transfer all at once (secondary transfer) the combination of the multiple toner images on the intermediary transferring member, onto a sheet of transfer medium such as recording paper, in their secondary transferring portion. Image forming apparatuses of the so-called tandem type, which employ a direct transferring method, do not have an intermediary transferring member which the image forming apparatus which use an intermediary transferring member has. Instead, they have a transfer medium conveyance belt as a transfer medium conveying member. They directly transfer in layers the toner images from the photosensitive drums in their multiple image forming stations onto a sheet of transfer medium borne by the transfer medium conveyance belt.

Some of the recent image forming apparatuses are structured so that their primary transferring member, intermediary transfer belt, and developing device can be separated from their photosensitive drum, or placed back in contact with the photosensitive drum to improve them, in terms of longevity of the photosensitive drum.

To describe in further detail with reference to an image forming apparatus of the tandem type which uses an intermediary transferring method, when the image forming apparatus disclosed in Japanese Laid-open Patent Application 2001-249519 is used in the monochromatic mode for forming a black-and-white image, only the photosensitive drum for forming a black image is placed in contact with the intermediary transfer belt, whereas the photosensitive drums for forming yellow, magenta, and cyan images, one for one, are kept separated from the intermediary transfer belt. Further, when the image forming apparatus disclosed in Japanese Laid-open Patent Application 2000-249519 is in the monochromatic (black-and-white) mode, the photosensitive drums for forming yellow, magenta, and cyan images, one for one, are kept stationary (not rotated).

Further, one of the prerequisites of the image forming apparatus disclosed in Japanese Laid-open Patent Application 2000-249519 is that when the apparatus is in the monochromatic (black-and-white) mode, the photosensitive drums for forming yellow, magenta, and cyan images, one for one, are kept stationary (not rotated). Thus, an image forming apparatus such as the one disclosed in Japanese Laid-open Patent Application 2000-249519 has to be provided with a mechanical power source for driving the photosensitive drums for forming yellow, magenta, and cyan images, in addition to the mechanical power source for driving the photosensitive drum for forming a black image, or a mechanism for separating the photosensitive drums for forming yellow, magenta and cyan images, from the mechanical power source for driving the photosensitive drums.

That is, an image forming apparatus such as the above-described one requires an additional power source which an image forming apparatus which cannot be operated in the monochromatic (black-and-white) mode does not require. In other words, enabling an image forming apparatus to be operated in the monochromatic (black-and-white) mode sometimes increases in size, and/or complicity, an image forming apparatus. Further, when an image forming apparatus such as the one described above is in the monochromatic (black-and-white) mode, the photosensitive drums for forming yellow, magenta, and cyan images are not driven, and therefore, it is possible that they will deviate in rotational phase from the photosensitive drum for the formation of a black image, which is one of the main causes of color deviation.

In the forgoing, one of the problems which conventional image forming apparatus suffer was described with reference to the image forming apparatus which uses an intermediary transferring method. However, conventional image forming apparatuses of the so-called tandem type, which uses the direction transferring method, also suffer the same problem as the one described above.

SUMMARY OF THE INVENTION

Thus, the primary object of the present invention is to provide an image forming apparatus which can prevent the problem that when the apparatus is in the monochromatic (black-and-white) mode, its image bearing members which are not being used for image formation become different in rotational phase from its image forming apparatus which is being used for image formation, and therefore, color deviation occurs.

According to an aspect of the present invention, there is provided an image forming apparatus comprising a plurality of image bearing members; a belt for receiving toner images from said image bearing members and for transferring the toner image onto a transfer material; and a controller for driving said image bearing members; wherein said image forming apparatus is operable in a monochromatic mode in which the toner image is formed only on a predetermined one of said image bearing members, and no image is formed on the other image bearing member; wherein in an operation in the monochromatic mode, said controller starts to drive said plurality of image bearing members in synchronism with each other in a state that said other image bearing member is spaced from said belt, and said predetermined image bearing member is in contact with said belt.

Further features of the present invention will become apparent from the following description of exemplary embodiments.

DESCRIPTION OF THE PREFERRED EMBODIMENTS

Hereinafter, the image forming apparatuses in accordance with the present invention are described in detail with reference to the appended drawings.

[Embodiment 1]

1. Overall Structure and Operation of Image Forming Apparatus

Figure 1:
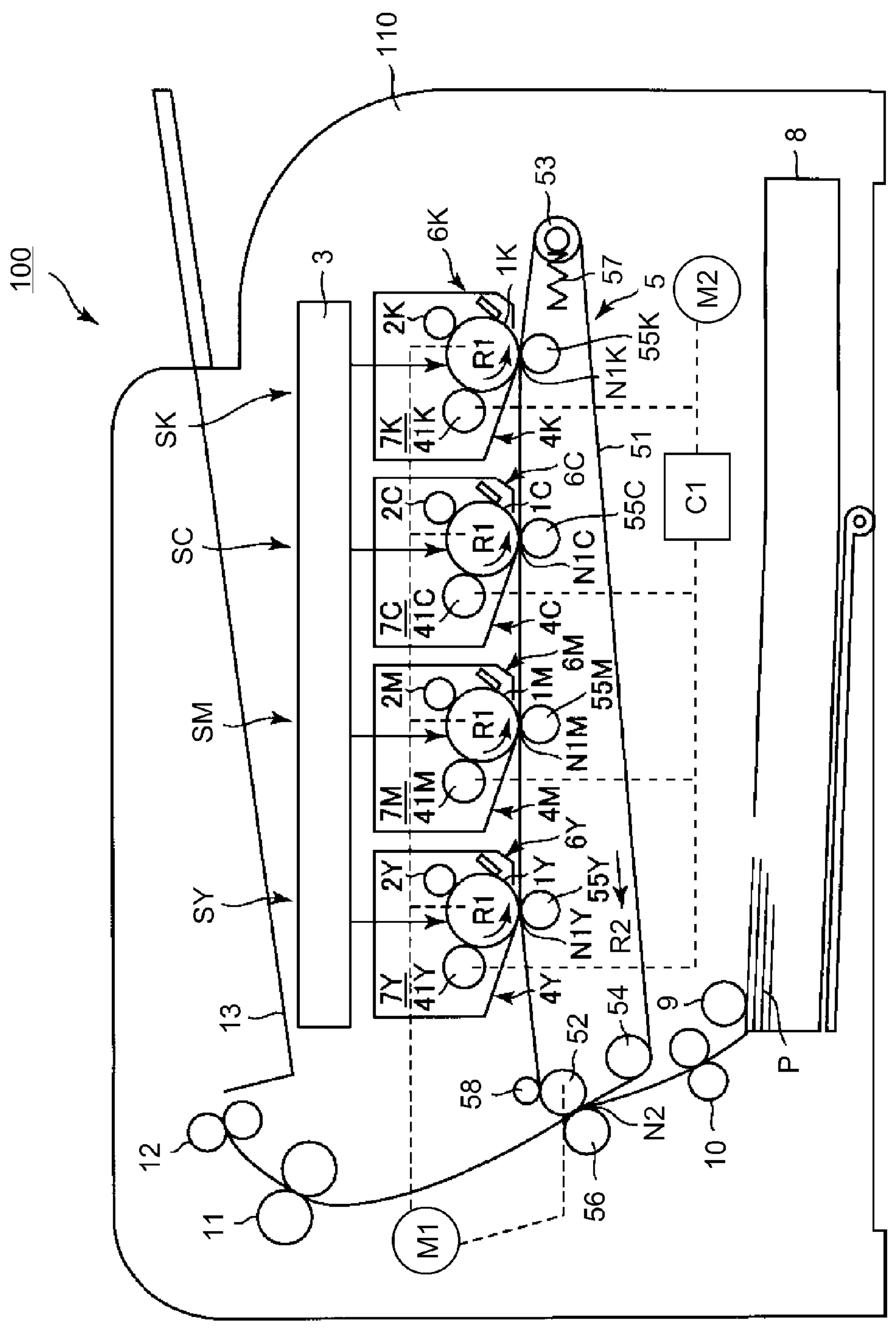
FIG. 1 is a schematic sectional view of the image forming apparatus in the first embodiment of the present invention, and shows the overall structure of the apparatus.

FIG. 1 is a schematic sectional view of the image forming apparatus in the first embodiment of the present invention. It shows the overall structure of the apparatus. The image forming apparatus 100 in this embodiment is a laser beam printer of the so-called tandem type. It uses an intermediary transfer method.

The image forming apparatus 100 has four image forming portions SY, SM, SC and SK, as image forming stations, which are aligned in parallel (tandem) in the direction parallel to the moving direction of its intermediary transfer belt 51, which will be described later. These image forming portions SY, SM, SC and SK form yellow, magenta, cyan and black monochromatic images, respectively. In this embodiment, the image forming portions SY, SM, SC and SK are the same (common) in structure and operation, although they are different in the color of the toner they use. In the following description of this embodiment, therefore, the suffixes Y, M, C and K, of the referential codes, which indicate the color of the toner which the image forming portions use, are not shown, in order to describe the four image forming portions together. Also in the following description of the embodiments of the present invention, the image forming portions SY, SM and SC, and their components, may be referred to as the color image forming portions, and color image forming elements, respectively.

Figure 2:
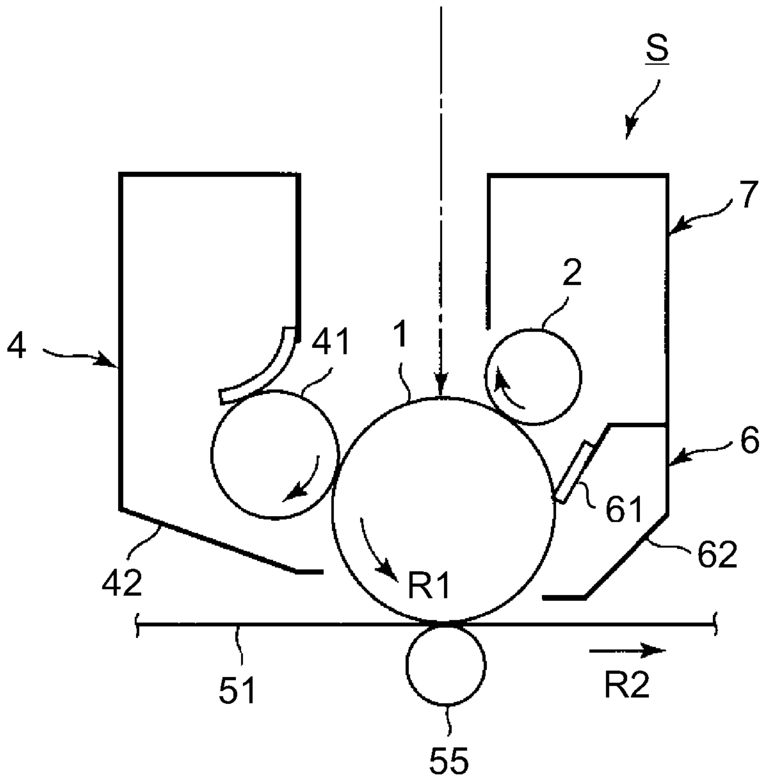
FIG. 2 is a schematic sectional view of one of the image forming portions of the image forming apparatus in the first embodiment, and shows the structure of the image forming portion.

FIG. 2 is a schematic sectional view of the image forming portion S. It is for describing in detail the image forming portion S. The image forming portion S has a photosensitive drum 1, as a rotatable image bearing member, which is cylindrical. The photosensitive drum 1 is rotationally driven in the direction indicated by an arrow mark R1 in FIG. 2. The photosensitive drum 1 has also various devices, which are disposed in the adjacencies of the peripheral surface of the photosensitive drum 1, being positioned in the listed order in terms of the rotational direction of the photosensitive drum 1. The first one is a charge roller as a charging device, which is a charging member in the form of a roller. The next one is an exposing device (laser scanner) 3 as an exposing device. In this embodiment, the image forming apparatus 100 is provided with only one exposing device, and is structured so that a beam of laser beam can be projected from the exposing device 3 upon each of the photosensitive drums 1Y, 1M, 1C and 1K of the image forming portions SY, SM, SC and SK, while being modulated according to information of the color components of the image to be formed. The next one is a developing device 4 as the developing device. The next one is a primary transfer roller 55 as the primary transferring device. The last one is a drum cleaner 6 as the photosensitive drum cleaning device.

The charge roller 2 is in connection to a charge voltage power source E1 (FIG. 3) as a charge bias applying device. To the charge roller 2, a DC voltage, which is negative in polarity, being therefore the same in polarity to which the photosensitive drum 1 is charged, is applied from the charge voltage power source E1. In this embodiment, the image forming portions SY, SM, SC and SK are provided with charge bias power sources E1Y, E1M, E1C and E1K, respectively.

The developing device 4 has: a developer container 42 which stores toner as developer; and a development roller 41, as the developing device, which is rotatably disposed in the developer container 42 in such a manner that it faces the opening of the developer container, which faces the photosensitive drum 1. The developing device 4 conveys the toner in the developer container 42 to the developing portion, which is the area in which the distance between the peripheral surface of the development roller 41 and the peripheral surface of the photosensitive drum 1 is smallest; the toner in the developer container 41 is borne by the development roller 4, and is conveyed to the developing station. In this embodiment, the polarity (normal polarity) to which the toner is charged for development is negative. The development roller 41 is in connection to a development bias power source E2 (FIG. 3) as a bias applying device. As the development bias, a vibratory voltage, that is, a combination of a DC voltage which is negative in polarity as the polarity to which toner is charged for development, and an AC voltage, is applied to the development roller 41 from the development bias power source E2. In this embodiment, the image forming portions SY, SM, SC and SK have their own development bias power sources E2Y, E2M, E2C and E2K, respectively. Also in this embodiment, the developing device 4 reversely develops the electrostatic latent image on the photosensitive drum 1 into a visible image, that is, an image formed of toner, by adhering the toner charged to the same polarity as the peripheral surface of the photosensitive drum 1, to the points of the peripheral surface of the photosensitive drum 1, which reduced in potential level in terms of absolute value because they were exposed after the peripheral surface of the photosensitive drum 1 was uniformly charged.

The drum cleaner 6 has: a cleaning blade 61, as an elastic cleaning member, which is placed in contact with the peripheral surface of the photosensitive drum 1, and is in the form of a long and narrow plate; and a container 62 for recovered toner, which stores the toner recovered from the peripheral surface of the photosensitive drum 1. The cleaning blade 61 is positioned so that its long edges extend across the entirety of the peripheral surface of the photosensitive drum 1, on which an image can be formed, in terms of the lengthwise direction (rotational axis) of the photosensitive drum 1. In this embodiment, the cleaning blade 61 is always kept in contact with the peripheral surface of the photosensitive drum 1.

There is disposed a transferring device (transfer unit) 5 below the combination of the photosensitive drums 1 of the image forming portions SY, SM, SC and SK. The transferring device 5 is for transferring the toner images formed in the image forming portions SY, SM, SC and SK onto a sheet P of transfer medium. It has an intermediary transfer belt 51, as an intermediary transferring member, onto which the toner images formed on the peripheral surfaces of the photosensitive drums 1Y, 1M, 1C and 1K, are transferred (primary transfer), and which is positioned so that it opposes all the photosensitive drums 1Y, 1M, 1C and 1K. The intermediary transfer belt 51 is suspended and kept tensioned by a driver roller 52, a tension roller 53, and an idler roller 54, which are in contact with the inward side of the intermediary transfer belt 51 in terms of the loop which the intermediary transfer belt 51 forms. The driver roller 52 transmits rotational driving force to the intermediary transfer belt 51. The tension roller 53 provides the intermediary transfer belt 51 with tension, by being moved in such a manner that its rotational axis is moved in the direction perpendicular to the moving direction of the intermediary transfer belt 51. The idler roller 54 is for adjusting the intermediary transfer belt 51 in angle at the front edge of the secondary transferring portion N2, which will be described later. As rotational driving force is transmitted to the driver roller 53, the intermediary transfer belt 51 is rotationally (circularly) moved in the direction indicated by an arrow mark R2 in the drawing. The intermediary transfer belt 51 is a transfer belt for transferring toner images from the photosensitive drums 1Y, 1M, 1C and 1K, onto a sheet of transfer medium.

The intermediary transfer belt 51 in this embodiment is an endless belt which is formed of such resin that has been adjusted in volume resistivity to $10^{10}$ Ω·cm by the addition of ion conductive agent. It is 100 μm in thickness. As for the material for the intermediary transfer belt 51 in this embodiment, it was polyfluorovinylidene (PVDF). However, it may be polyimide, polycarbonate, polyethylene, polypropyrene, polyamide, polysulphon, polyalyrate, polyethylene-terephthalate, polyethersulphon, thermoplastic polyimide, and the like resinous substance. Further, it may be provided with a hard surface layer formed of acrylic, or the like.

The driver roller 52 in this embodiment is made up of a metallic core and an elastic layer, and is no more than $10^5$ Ω·cm in electrical resistance. The metallic core is a piece of hollow aluminum tube which was 24 mm in external diameter. The elastic layer covers virtually the entirety of the peripheral surface of the metallic core, and is 0.5 mm in thickness. It is formed of EPDM rubber.

The tension roller 53 is kept pressed in a preset direction by a tension spring 57, as a pressure applying member, providing thereby the intermediary transfer belt 51 with a preset amount of tension.

There are disposed primary transfer rollers 55Y, 55M, 55C and 55K on the inward side of the loop (belt loop) which the intermediary transfer belt 51 forms, being positioned so that they oppose the photosensitive drums 1Y, 1M, 1C and 1K, with the intermediary transfer belt 51 pinched between the photosensitive drums 1Y, 1M, 1C and 1K, and primary transfer rollers 55Y, 55M, 55C and 55K, respectively. The primary transfer roller 55 is kept pressed against the photosensitive drum 1 with the placement of the intermediary transfer belt 51 between itself and the photosensitive drum 1, forming thereby the primary transferring portion N1 (primary transfer nip), in which the intermediary transfer belt 51 and photosensitive drum 1 contact each other. The primary transfer roller 55 is rotated by the rotational (circular) movement of the intermediary transfer belt 51. The device for keeping the primary transfer roller pressed will be described later in detail. The primary transfer roller 55 is in connection to a primary transfer bias power source E3 (FIG. 3) as a device for applying the primary transfer bias. As for the primary transfer bias, a positive DC voltage which is opposite in polarity from the polarity to which toner is charged for development, and which is preset in potential level, is applied to the primary transfer roller 55 from the primary transfer bias power source E3. In this embodiment, the image forming portions SY, SM, SC and SK are provided with their own primary transfer bias power sources E3Y, E3M, E3C and E3K, respectively.

There is disposed a secondary transfer roller 55, as a secondary transferring member, on the outward side of the loop which the intermediary transfer belt 51 forms, being positioned in a manner to oppose the driver roller 52 with the intermediary transfer belt 51 pinched between the secondary transfer roller 56 and driver roller 52. The secondary transfer roller 56 is in connection to a secondary transfer bias power source E4 (FIG. 3) as a secondary transfer bias applying device. As the secondary transfer bias, a positive DC voltage, being therefor opposite in polarity from the polarity to which toner is charged for development, is applied from the secondary transfer bias power source E4. The secondary transfer roller 56 is kept pressed toward the driver roller 52 by a compression spring (unshown), forming thereby a second transfer portion (secondary transfer nip) N2, which is the area of contact between the intermediary transfer belt 51 and secondary transfer roller 56. The secondary transfer roller 56 is rotated by the circular movement of the intermediary transfer belt 51.

The image forming apparatus is provided with a toner charging brush 58, as an intermediary transferring member cleaning device, for removing the toner (residual toner) having adhered to the intermediary transfer belt 51. The toner charging member is in the form of a brush. The toner charging brush 58 is positioned so that it opposes the driver roller 52, with the presence of the intermediary transfer belt 51 between itself and driver roller 52. As the intermediary transfer belt 51 is circularly moved, the toner charging brush 58 rubs the surface of the intermediary transfer belt 51. That is, in this embodiment, the toner charging brush 58 is a type of rubbing member which slides on the surface of the intermediary transfer belt 51 in relative terms. Further, to the toner charging brush 58, a voltage which is preset in potential level, and is positive in polarity, being therefore opposite in polarity to the polarity to which toner is charged for development, is applied. Thus, the toner charging brush 58 temporarily recovers the toner (residual toner) having adhered to the intermediary transfer belt 51, while charging the toner to the opposite polarity to the polarity to which the toner is charged for development. Then, the charged residual toner is transferred from the intermediary transfer belt 51 onto the photosensitive drum 1, by the function of the positive bias, which is applied to the primary transfer roller 55, and is opposite in polarity to the polarity to which the toner is charged for development. Then, the toner is recovered by the drum cleaner 6. The toner charging brush 58 may be in the form of a rotatable roller-brush, or a stationary deck-brush. The toner cleaning brush 58 in this embodiment is in the form of a roller-brush.

Incidentally, the intermediary transferring member cleaning device does not need to be in the form of an electrostatic toner recovering device such as the one described above. That is, it may be in the form of a cleaning device which employs a cleaning blade, which is in the form of a piece of elastic plate to be placed in contact with the intermediary transfer belt 51.

In this embodiment, the intermediary transfer belt 51 and all the photosensitive drums 1, are driven by a single and common motor (shared motor) M1 as a driving force source. The intermediary transfer belt 51, and photosensitive drums 1, are directly in connection to the common (shared) motor M1. That is, they are connected to the motor M1, without provision of a connective mechanism such as a clutch between themselves and the motor M1. This structural arrangement can simplify an image forming apparatus in size and structure.

Figure 12:
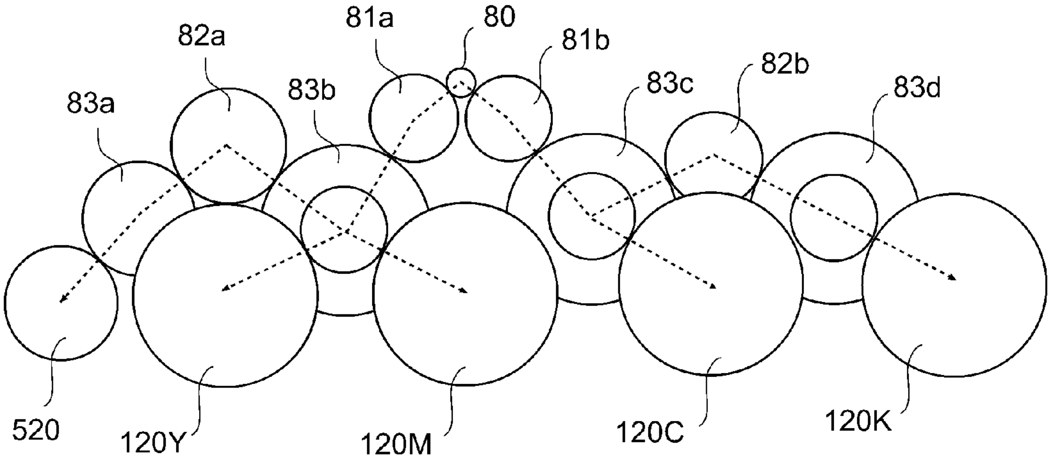
FIG. 12 is a schematic drawing for describing the driving force transmitting mechanism which transmits driving force to each of multiple gears, from a common (shared) driving force source.

FIG. 12 is a sectional view of the driving force transmitting mechanism in this embodiment. The driving force from the drum gear 80 driven by the common motor M1, as the shared driving force source, is divided by idler gears 81*a*, 81*b*, 82*a*, 82*b*, 83*a*, 83*b*, 83*c* and 83*d*, and then, is transmitted to a driving gear 520 for driving the driver roller 52, and the drum gears 120Y, 120M, 120C and 120K of the photosensitive drums 1Y, 1M, 1C and 1K, respectively. Thus, the driver roller 52, and the photosensitive drums 1Y, 1M, 1C and 1K, rotate.

Meanwhile, the development rollers 41Y, 41M, 41C and 41K, which correspond to yellow, magenta, cyan, and black color components, respectively, are driven by a motor M2 (common motor) as a driving force source, which is shared by the four development rollers 41. More specifically, the development roller 41K for forming a black toner image is in direct connection to the developing device driving motor M2, whereas the development rollers 41Y, 41M and 41C for forming yellow, magenta and cyan images, respectively, are in indirect connection to the developing device driving motor M2, through a clutch (development clutch) Cl as an engaging-disengaging mechanism. Therefore, the development rollers 41Y, 41M and 41C for yellow, magenta, and cyan color components, respectively, can be kept stationary while the development roller 41K for black color is rotated.

Further, the image forming apparatus 100 is provided with a transfer medium delivering device for delivering a sheet P of transfer medium to the secondary transferring portion N2, a fixing device for fixing a toner image to the sheet P, and the like device, in addition to the above-described devices.

In this embodiment, the photosensitive drums 1, and drum processing devices, (charge rollers 2, developing devices 4, and drum cleaners 6) are integrally held by a frame (cartridge: process cartridge 7) so that they can be removably installed in the main assembly 110 of the image forming apparatus 100. That is, the image forming apparatus 100 is structured so that process cartridges 7Y, 7M, 7C and 7K are removably installable in the image forming portions SY, SM, SC and SK, respectively.

2. Controlling of Image Forming Apparatus

Figure 3:
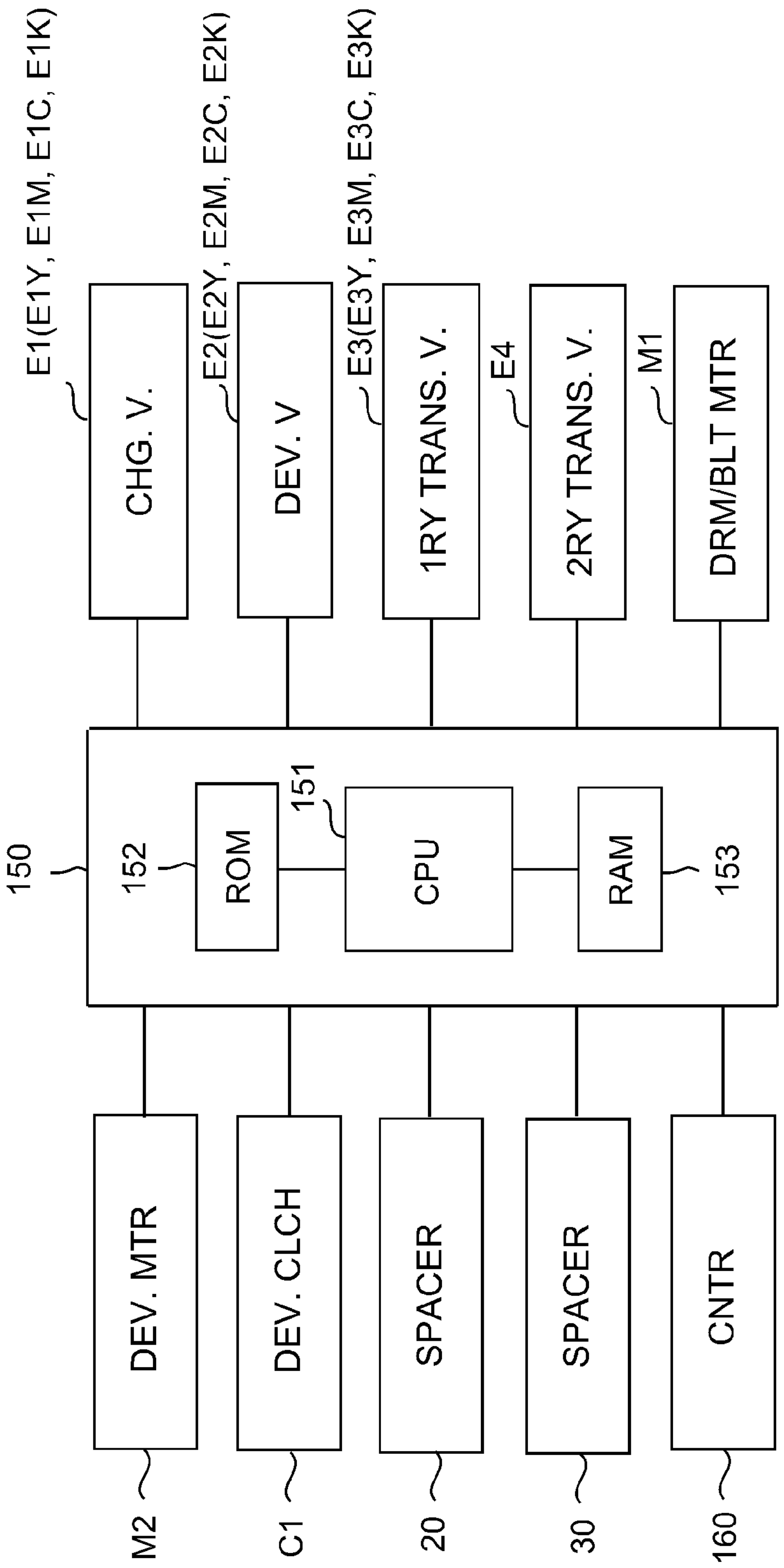
FIG. 3 is a block diagram of the essential portion of the image forming apparatuses in the first embodiment, which is for describing the control of the essential portions.

FIG. 3 shows the general control of the essential portions of the image forming apparatus 100 in this embodiment. The operation of the image forming apparatus 100 is integrally controlled by the control portion 150 with which the image forming apparatus main assembly 110 is provided. The control portion 150 is made up of a CPU 151, a ROM 152, a RAM, etc. The CPU 151 is the central element for computation. The ROM 152 and RAM 153 are the storage devices. It is in the RAM 153, which is a rewritable memory, that the information inputted into the control portion 150, detected information, results of computation, and the like, are stored. It is in the ROM 152 that control programs, preset data tables, etc., are stored. The CPU 151 is enabled to read and/or transfer the data in the ROM 152 and RAM 153.

The CPU 151 makes the image forming apparatus 100 carry out an image formation sequence, following the control programs stored in the ROM 152, while integrally controlling various portions of the image forming apparatus 100. In this embodiment, the CPU 151 turns on or off the above described various electrical power sources E1-E4, and also controls their output value. Further, it turns on or off the common motor M1 and developing device driving motor M2, and also engages or disengages the development clutch C1. Further, it controls the operation for switching between the separation unit 20 and moving unit 30, which will be described later. Further, it records the number of rotations of the photosensitive drums 1 in a rotation counter 160, in response to the results of a sensor (unshown) which detects the number of rotations of the photosensitive drum 1. Further, it reads, as necessary, the information (number of rotation of photosensitive drum 1) stored in the rotation counter 160, to control the image forming apparatus 100.

The main assembly 110 of the image forming apparatus 100 is in connection to an external host apparatus such as an image reading apparatus, a personal computer, and/or the like, so that various information signals such as image data and the like can be inputted into the control portion 150 of the apparatus main assembly 110 from the host apparatuses.

3. Operation of Image Forming Apparatus

Next, the image forming modes of the image forming apparatus 100 in this embodiment are described. In this embodiment, the image forming apparatus 100 is enabled to operate in multiple image formation modes, more specifically, the first image formation mode, and second image formation mode (image formation mode for selected color or color components), which are different in the number of photosensitive drums used in the operation. In this embodiment, the first image formation mode is the full-color mode. In the full-color mode, all of the photosensitive drums 1Y, 1M, 1C and 1K of the image forming portions SY, SM, SC and SK, for yellow, magenta, cyan and black color elements, respectively, are used for image formation.

In comparison, in the monochromatic (black-and-white) mode, only the photosensitive drum 1K, which is for black color component, is used for image formation. The black-and-white mode is one of the monochromatic modes in which a toner image of a specific (selected) color can be formed, whereas the color selection image formation mode is an operational mode in which an image is formed in only the selected color, that is, an image is formed in only one of the multiple image forming portions of the image forming apparatus 100.

3-1. Full-color Mode

First, the image forming operation in the full-color mode is described.

As an image forming operation is started, sheets P of transfer medium in a cassette 8 are fed into the apparatus main assembly 110 one by one. Then, each sheet P of transfer medium is conveyed to a pair of registration rollers 10. In this step, the registration rollers 10 are kept stationary (not rotated). Thus, as the sheet P is corrected in attitude (if it is being conveyed askew) by being made to collide with the nip between the pair of registration rollers 10.

Meanwhile, images are formed in synchronism with the conveyance of each sheet P of transfer medium. That is, all the photosensitive drums 1, and the intermediary transfer belt 51, begin to be rotationally driven. More specifically, first, the peripheral surface of the photosensitive drum 1Y in the image forming portion S for yellow color component, begins to be uniformly and negatively charged by the charge roller 2Y. Then, the development roller 41Y of the developing device 4Y begins to be rotated, and the rotating development roller 41Y is placed in contact with the photosensitive drum 1Y. A development roller moving unit for switching the development roller 41 in terms of the position relative to the photosensitive drum 1 will be described later. After the development roller 41Y and photosensitive drum 1Y become stable in the state of contact relative to each other, the peripheral surface of the photosensitive drum 1Y is exposed by the exposing device 3, whereby an electrostatic latent image (electrostatic image), which corresponds to the yellow color components of the image to be formed, is effected on the peripheral surface of the photosensitive drum 1Y. Next, the electrostatic latent image on the photosensitive drum 1Y is developed into a visible image, that is, a yellow toner image, by the developing device 4Y, which uses negatively charged yellow toner. Then, the yellow toner image formed on the peripheral surface of the photosensitive drum 1Y is transferred (primary transfer) onto the intermediary transfer belt 51 by the primary transfer roller 55Y which is being supplied with the primary transfer bias.

The toner image forming operation such as the one described above, which comprises the above described sequential steps is sequentially carried out also in the image forming portions SM, SC and SK for the magenta, cyan and black color components, respectively, with preset timings. Thereafter, the four toner images, different in color, formed on the photosensitive drums 1Y, 1M, 1C and 1K for the yellow, magenta, cyan and black color components, respectively, are sequentially transferred (primary transfer) in layers, onto the intermediary transfer belt 51, in their primary transferring portions N1.

After being transferred in layers onto the intermediary transfer belt 51, the four toner images, different in color, are moved into the secondary transferring portion N2 by the circular movement of the intermediary transfer belt 51. As for the sheet P of transfer medium corrected in attitude by the registration rollers 10, the sheet P is sent to the secondary transfer portions N2, with such a timing that it arrives at the secondary transferring portion N2 at the same timing as the toner images on the intermediary transfer belt 51. Thereafter, the four toner images, different in color, on the intermediary transfer belt 51 are transferred together (secondary transfer) onto the sheet P by the secondary transfer roller 56 which is being supplied with the secondary transfer bias.

After the transfer of the toner images onto the sheet P of transfer medium, the sheet P is conveyed to the fixing apparatus 11 as a fixing device, in which the sheet P and toner images thereon are subjected to heat and pressure. Consequently, the layered toner images on the sheet P become fixed to the sheet P. Thereafter, the sheet P which is bearing the fixed toner images, is discharged by a pair of discharge rollers 12, into the delivery tray 13 in which the sheets P are to be accumulated.

As for the toner (primary transfer residual toner) remaining on the photosensitive drum 1 after the completion of the primary transfer process, it is removed by the drum cleaner 6; the photosensitive drum 1 is cleaned by the drum cleaner 6. More concretely, the drum cleaner 6 is provided with a cleaning blade 61 positioned so that it remains in contact with the peripheral surface of the photosensitive drum 1. Thus, as the photosensitive drum 1 is rotated, the primary transfer residual toner on the peripheral surface of the photosensitive drum 1 is scraped away from the peripheral surface of the photosensitive drum 1, and is recovered into a toner container 62 for recovered toner. Further, after the completion of the secondary transfer described above, the toner remaining (secondary transfer residual toner) on the surface of the intermediary transfer belt 51 is removed by a toner charging brush 58 disposed in the adjacencies of the driver roller 52. In this embodiment, when the image forming apparatus 100 is in the full-color mode, the secondary transfer residual toner is charged by the toner charging brush 58, and is transferred onto the peripheral surface of the photosensitive drum 1Y, at the same time as the primary transfer, primarily in the image forming portion SY for the yellow color component. Then, it is recovered by the drum cleaner 6Y. By the way, a part of the secondary transfer residual toner on the intermediary transfer belt 51 may be transferred onto at least one of the photosensitive drums 1 for the magenta, cyan and black color components, respectively, and be recovered by the drum cleaner 6.

3-2. Monochromatic (Black-and-white) Mode

Next, the image forming operation in the monochromatic (black-and-white) mode is described.

The monochromatic (black-and-white) mode is intended to retard the shaving of the photosensitive drum 1 and the toner deterioration, which are attributable to the contact between the photosensitive drum 1 and development roller 41, and also, the contact between the photosensitive drum 1 and intermediary transfer belt 51, which occur in the image forming portions SY, SM and SK, that is, an image forming portions other than the image forming portion SK for black color component. Therefore, when the image forming apparatus 100 is in the monochromatic (black-and-white) mode, the photosensitive drums 1 in the image forming portions SY, SM and SC, that is, the image forming portions other than the image forming portion SK for black color component, are kept separated from the intermediary transfer belt 51. Further, the development rollers 41 in the image forming portions SY, SM and SC are kept separated from the photosensitive drums 1Y, 1M and 1C, respectively. That is, among the photosensitive drums 1Y, 1M, 1C and 1K, images are formed on only a specific photosensitive drum (photosensitive drum 1K, for example); no toner image is formed on the other photosensitive drums (1Y, 1M and 1C, for example) than the specific one. Then, the toner image formed on the specific photosensitive drum 1 (photosensitive drum 1K, for example) is transferred onto a sheet P of transfer medium.

Figure 4:
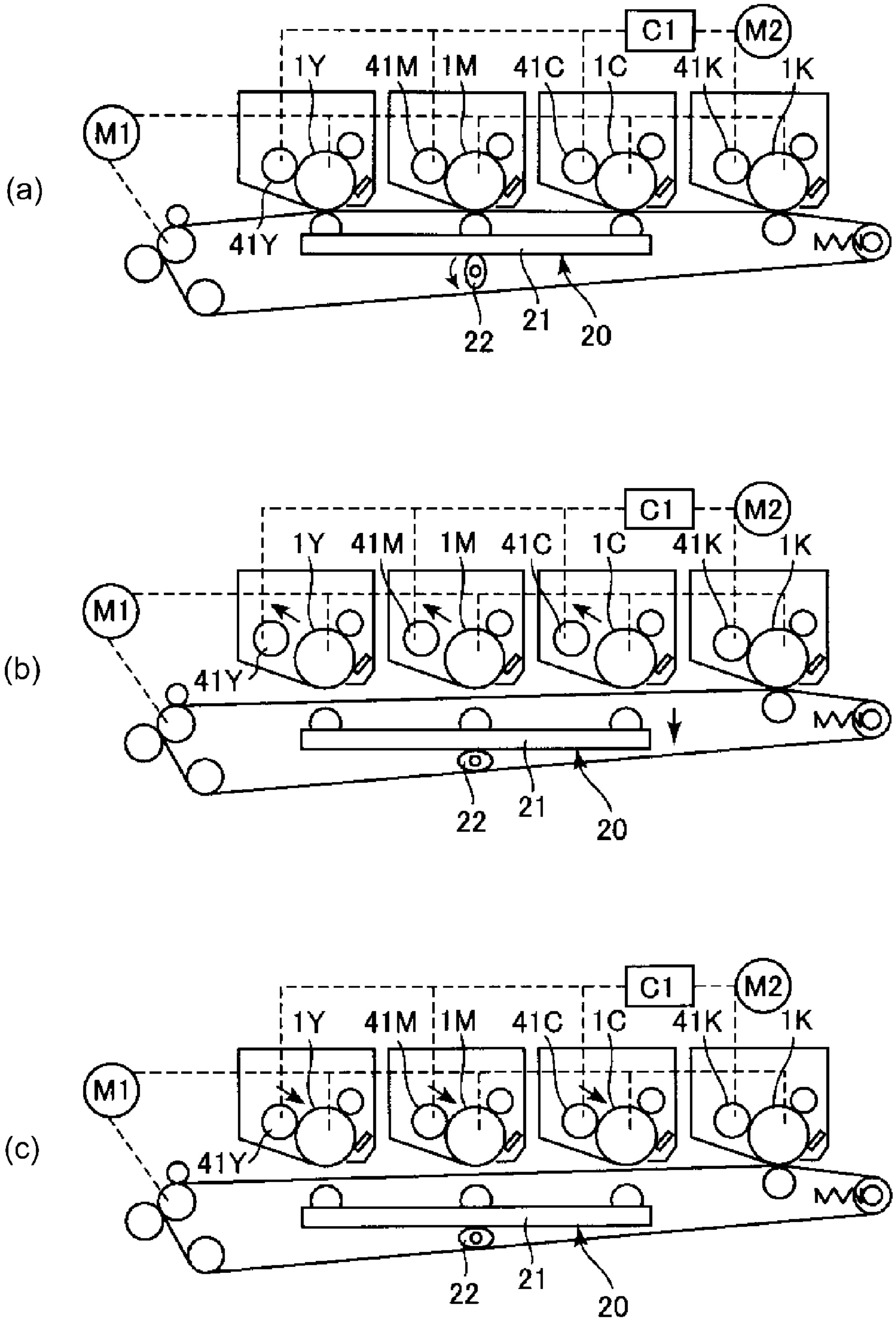
FIG. 4 is a schematic drawing for describing the operation of the separation unit of the image forming apparatus in the first embodiment.

Referring to FIG. 4, in this embodiment, the image forming apparatus 100 has the separation unit 20, which is for separating the primary transfer rollers 55 for yellow, magenta, and cyan color components), from the photosensitive drums 1, in the image forming portions SY, SM and SC, and also, for separating the intermediary transfer belt 51 from the photosensitive drums 1. The separation unit 20 has a holding member 21, and an engaging-disengaging cam 22 as a switching member.

The holding member 21 rotatably supports the primary transfer rollers 55Y, 55M and 55C for the yellow, magenta, and cyan color components, respectively, by their end portions in terms of their lengthwise direction (which is parallel to their rotational axis). Further, it can be moved by the rotation of the engagement-disengagement cam 22, into the first position in which it is closer to the photosensitive drums 1Y, 1M and 1C for the yellow, magenta, and cyan color components, respectively, and second position in which it is farther from the photosensitive drums 1Y, 1M and 1C, respectively. That is, the holding members 21 can move together the primary transfer rollers 55Y, 55M and 55C for the yellow, magenta and cyan color components, respectively, to the first position (position of contact) in which the transfer rollers 55 are closer to the photosensitive drums 1Y, 1M and 1C for the yellow, magenta, and cyan color components, respectively, and to the second position (position of separation) in which the transfer rollers 55 are farther from the photosensitive drums 1Y, 1M and 1C. When the holding member 21 is in the first position, the primary transfer rollers 55Y, 55M and 55C keep the intermediary transfer belt 51 in contact with the photosensitive drums 1Y, 1M and 1C for the yellow, magenta and cyan color components, respectively, so that a preset amount of pressure is maintained between the intermediary transfer belt 51 and photosensitive drums 1. In other words, the primary transfer rollers 55Y, 55M and 55C for the yellow, magenta, and cyan color components, respectively, are kept pressed against the photosensitive drums 1Y, 1M and 1C for yellow, magenta and cyan color components, respectively, with the presence of the intermediary transfer belt 51 between themselves and the photosensitive drums 1Y, 1M and 1C, respectively. In comparison, when the holding member 21 is in the second position, the primary transfer rollers 55Y, 55M and 55C for yellow, magenta and cyan color components, respectively, are kept separated from the intermediary transfer belt 51, and therefore, are not pressed at all against the photosensitive drums 1Y, 1M and 1C, with the presence of the intermediary transfer belt 51 between themselves and the photosensitive drums 1Y, 1M and 1C, respectively. The engagement-disengagement cam 22 is rotated by an engagement-disengagement motor (unshown), by such a preset angle that the holding member 21 is placed in the first or second position.

Further, in this embodiment, the image forming apparatus 100 has the development roller moving units 30, which is for separating the development roller 41 from the photosensitive drum 1. In this embodiment, each image forming portion S has the development roller moving unit 30. The development roller moving unit 30 places the development roller 41 in contact with the photosensitive drum 1 at least during a developing operation. Further, it keeps the development roller 41 away from the photosensitive drum 1 when the image forming apparatus 100 is kept on standby. Also in this embodiment, when the developing device 4 in the image forming portions SY, SM or SC is replenished with toner, the development rollers 41 in the image forming portions SY, SM and SC are kept in contact with the photosensitive drums 1Y, 1M and 1C, respectively, as will be described later in detail. As for the structure of the development roller moving unit 30, it is optional. That is, any structure compatible with the image forming apparatus 100 may be used. For example, referring to FIG. 5, a process cartridge 7 may be structured so that the cleaning means frame 7*a* of the cartridge 7, by which the photosensitive drum 1 and drum cleaner 6 are held, is connected to the developing means frame 7*b* of the process cassette 7, so that the cleaning means frame 7*a* can be rotationally moved about the axle 7*c*.

Figure 5:
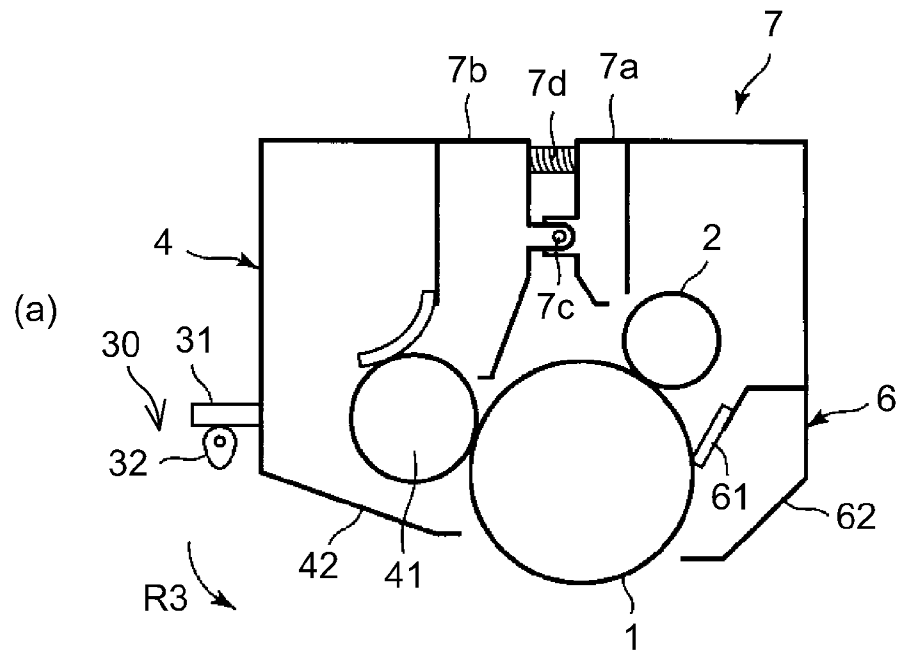
FIG. 5 is a schematic drawing for describing the operation of the developing portion separating mechanism in the first embodiment.
Figure 5:
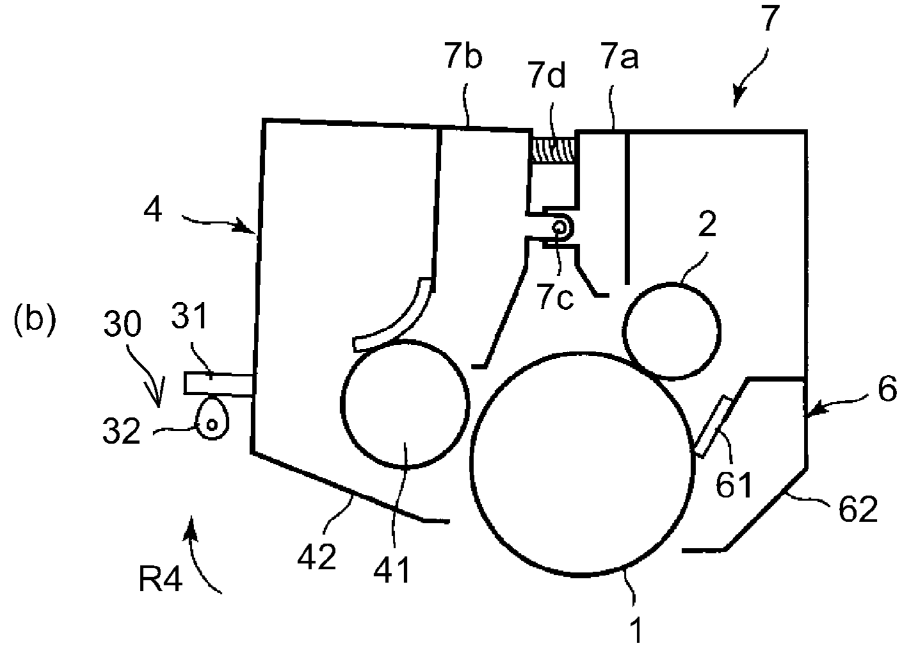

Further, referring to FIG. 5(*a*), there is placed a compression spring 7*d*, as a pressure applying device, between the cleaning means frame 7*a* and developing means frame 7*b*, so that the developing means frame 7*b* remains under the pressure generated by the compression spring 7*d* in a manner to rotate the developing means frame 7*b* in the direction indicated by an arrow mark R3 indicated in FIG. 5(*a*) to keep the development roller 41 in contact with the photosensitive drum 1. Further, the developing means frame 7*b* is provided with a driving force catching portion 31, which makes up a part of the development roller moving unit 30, and the image forming apparatus 110 is provided with a development cam 31, as a switching portion, which makes up another part of the development roller moving unit 30.

Next, referring to FIG. 5(*b*), as the driving force catching portion 31 is pushed up by the development cam 32, the developing means frame 7*b* is rotationally moved in the direction indicated by an arrow mark 4 in FIG. 5(*b*) so that the development roller 4 separates from the photosensitive drum 1. The development cam 32 is rotated by the development portion engagement-disengagement motor (unshown) as a driving force source. Thus, the development roller 41 can be switched in position between the first position (position of contact) in which it is closer to the photosensitive drum 1, and the second position (position of separation) in which it is farther from the photosensitive drum 1.

Next, the operation for switching the image forming apparatus 100 in operational mode is described with reference to a case in which the image forming apparatus 100 is switched in operational mode from the full-color mode to the monochromatic (black-and-white) mode. First, the primary transfer rollers 55Y, 55M and 55C for yellow, magenta and cyan color components, respectively, are moved by the separation unit 20 from their first position (position of contact) to their second position (position of separation). Then, the development rollers 41Y, 41M and 41C for yellow, magenta and cyan color components, respectively, are moved by the development roller moving unit 30 from the first position (position of contact) to the second position (position of separation). At the same time, the charge bias power source E1Y, E1M and E1C for yellow, magenta and cyan color components, respectively, are turned off. Lastly, the transmission of driving force from the development roller driving motors M2 to the development rollers 41Y, 41M and 41C for yellow, magenta and cyan color components, respectively, is interrupted by the development clutch C1 to stop the rotation of the development rollers 41Y, 41M and 41C. Meanwhile, in the image forming portion SK for black color, the primary transferring member 55K is kept pressed against the photosensitive drum 1 with the presence of the intermediary transfer belt 51 between itself and photosensitive drum 1K, and the development roller 41K is kept in contact with the photosensitive drum 11. Further, the charge bias power source E1K is kept turned on. Thus, only the image forming portion SK for black color component is enabled to form images.

Through the above-described process, the operation in which the image forming apparatus 100 which is in the state (which hereafter may be referred to as "state of all contact"), in which it operates in the full-color mode, is put into the state, shown in FIG. 4(*a*), (which hereafter may be referred to as "state of single contact"), is completed.

In this embodiment, during the above described process, the photosensitive drums 1Y, 1M, 1C and 1K, and the intermediary transfer belt 51, are driven by the common motor M1 as described above. Therefore, even when the image forming apparatus 100 is in the monochromatic (black-and-white) mode, the photosensitive drums 1Y, 1M and 1C, which are kept separated from the intermediary transfer belt 51, continue to rotate.

Therefore, when the image forming apparatus 100 is in the monochromatic (black-and-white) mode, the photosensitive drums 1Y, 1M and 1C, which are not in contact with the intermediary transfer belt 51 begin to be rotated in synchronism with the photosensitive drum 1K which is to be used for image formation in the black-and-white mode. With the employment of this structural arrangement, the photosensitive drum 1Y, 1M and 1C, which are not used in the monochromatic (black-and-white) mode also begin to be rotated at the same time as the photosensitive drum 1K which is used in the monochromatic (black-and-white) mode. Therefore, it is unlikely for the photosensitive drums 1Y, 1M, 1C and 1K to become different in rotational phase from the photosensitive drum 1K. Therefore, when the image forming apparatus 100 is switched in operation mode from the monochromatic (black-and-white) mode to the full-color mode, it is unlikely for the image forming apparatus 100 to output images which suffer from the color deviation attributable to the synchronism in rotational phase among the photosensitive drums 1Y, 1M, 1C and 1K.

Further, the photosensitive drums 1Y, 1M and 1C are rotated even when the image forming apparatus 100 is in the monochromatic (black-and-white) mode. Therefore, the image forming apparatus 100 in this embodiment is shorter in the length of time required to be switched in operational mode from the monochromatic (black-and-white) mode into the full-color mode than an image forming apparatus in accordance with the prior art. Further, the intermediary transfer belt 51, and all the photosensitive drums 1, are directly in connection to the common motor M1, that is, without the presence of a connective mechanism such as a clutch. Therefore, the image forming apparatus 100 in this embodiment is smaller in overall size, and simpler in structure, than an image forming apparatus in accordance with the prior art.

Figure 13:
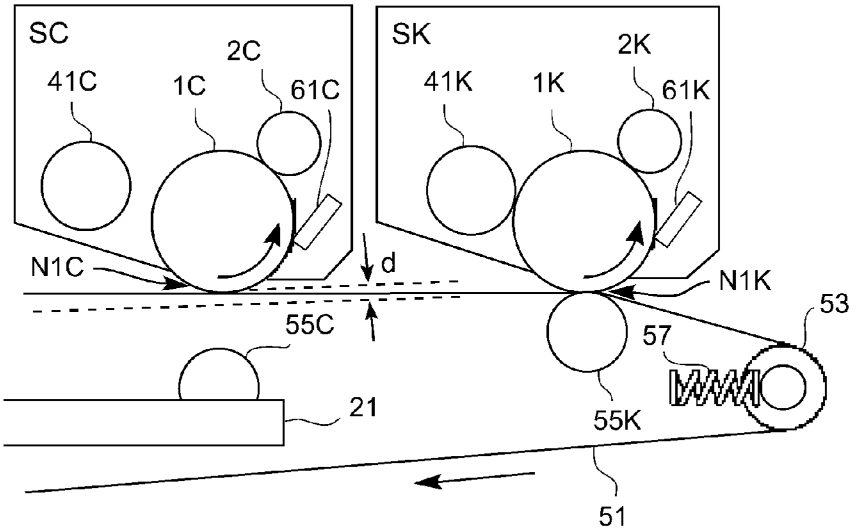
FIG. 13 is an enlarged schematic drawing of a part of FIG. 4(*b*).

FIG. 13 is an enlarged view of the image forming portions SC and SK, and intermediary transfer belt 51, which are shown in FIG. 4(*b*). Ordinarily, in the monochromatic (black-and-white) mode, as the primary transfer roller 55C is separated from the intermediary transfer belt 51, the intermediary transfer belt 51 separates from the photosensitive drum 1C of the image forming portion SC, by a distance d.

However, from the standpoint of reducing an image forming apparatus in overall size, it is desired to reduce the distance d. However, reducing the distance d possibly allows the intermediary transfer belt 51 to come into contact with the photosensitive drum 1C, in the monochromatic (black-and-white) mode. However, the image forming apparatus 100 in this embodiment is structured so that even in the monochromatic (black-and-white) mode, in which the photosensitive drums 1Y, 1M and 1C which are not used in the monochromatic (black-and-white) mode, are made to rotate, while remaining separated from the intermediary transfer belt 51. Therefore, it is unlikely to occur that when the intermediary transfer belt 51 is placed in contact with the photosensitive drums 1Y, 1M and 1C, the photosensitive drums 1Y, 1M and 1C are rubbed by the intermediary transfer belt 51.

The image forming apparatus 100 in this embodiment has a sensor for detecting the rotation of the photosensitive drum 1 in each image forming portion S; and a rotation counter 160 made up of a storage device for storing the rotation count of each photosensitive drum 1 (FIG. 3).

In this embodiment, the rotation counter 160 records the number of rotations of the photosensitive drum 1 in each image forming operation. In particular, in this embodiment, the number of photosensitive member rotation recorded in the rotation counter 160 in the monochromatic (black-and-white) mode, more specifically, the number of times the photosensitive drums 1Y, 1M and 1C were rotated in the monochromatic (black-and-white) mode, that is, the photosensitive drum 1K for forming a black-and-white image is in the state shown in FIG. 4(*b*), is used to determine whether or not a toner supplying operation, which will be described later, needs to be carried out. In this embodiment, all the photosensitive drums 1 are rotationally driven by the one and only driving force source, always in synchronism with each other. Therefore, the number of times the photosensitive drums 1Y, 1M and 1C for yellow, magenta and cyan color components, respectively, are rotated in a given image forming operation in the above described monochromatic (black-and-white) mode is the same as the number of times the photosensitive drum 1K is rotationally driven in the same monochromatic image formation mode.

When the image forming apparatus 100 is used for the first time in the monochromatic (black-and-white) mode, the value in the rotation counter 160 is zero. Then, each time a toner supplying operation, which will be described later, is carried out, the value (number of time photosensitive drum 1K was driven) in the rotation counter 160 is reset to zero. In other words, in this embodiment, the rotation counter 160 or the like makes up a device for detecting information related to the amount of operation carried out in the monochromatic (black-and-white) mode, as one of image formation modes, by the image forming apparatus 100. In this embodiment, it is by this detecting device that the information related to the amount by which the image forming apparatus 100 is continuously operated in the monochromatic (black-and-white) mode is stored.

As described above, in this embodiment, when the image forming apparatus 100 is operated in the monochromatic (black-and-white) mode, all the photosensitive drums 1Y, 1M, 1C and 1K begin to be operated at the same time. In other words, the photosensitive drums 1Y, 1M and 1C are rotated even in the monochromatic (black-and-white) mode. Therefore, the following problems possibly occur.

That is, in a case where a substantial number of prints are continuously outputted in the monochromatic (black-and-white) mode, the peripheral surface of each of the photosensitive drums 1Y, 1M and 1C is continuously scraped by the blade 6, without being replenished with toner. Thus, the peripheral surface of the photosensitive drum 1 runs out of toner. The toner (or its additive) on the peripheral surface of the photosensitive drum 1 plays the role of lubricating between the cleaning blade 61 and the peripheral surface of the photosensitive drum 1, in addition to the role of forming a visible image on the peripheral surface of the photosensitive drum 1.

Therefore, as the peripheral surface of the photosensitive drum 1 runs out of toner, the friction between the cleaning blade 61 and peripheral surface of the photosensitive drum 1 increases. As the amount of friction between the cleaning blade 61 and the peripheral surface of the photosensitive drum 1 exceeds a certain value, it is possible that a part, or the entirety, of the cleaning blade 61 will not be able to withstand the friction. If a part or parts of the cleaning blade are damaged and/or broken off, it is possible that such a problem that the cleaning blade 61 fails to properly clean the peripheral surface of the photosensitive drum 1 and/or the entirety of the cleaning blade 61 is bent as if it is peeled away from the peripheral surface of the photosensitive drum 1 will occur.

In this embodiment, therefore, in the monochromatic (black-and-white) mode, the photosensitive drums 1Y, 1M and 1C are supplied with a certain amount of toner with preset intervals to prevent the cleaning blade 61 from being bent as if it is turned or tucked.

In this embodiment, all the photosensitive drums 1Y, 1M, 1C and 1K are supplied with a certain amount of toner (for lubrication) while no image is formed in the monochromatic (black-and-white) mode. That is, in this embodiment, the operation for supplying the peripheral surface of each of the photosensitive drums 1Y, 1M, 1C and 1K with toner to lubricate the peripheral surfaces is carried out while no image is formed (or apparatus is on standby) in the monochromatic (black-and-white) mode. Further, if necessary, the length of time an image forming operation is interrupted to supply the photosensitive drums 1 with lubricational toner may be extended. The following are examples of a period in an image forming operation, during which no image is formed: paper intervals in a continuous printing job in which images are continuously formed; interval between consecutive printing jobs; pre- or post-calibration period (image density adjustment operation, color deviation correction operation, etc., carried out with use of test image (test patch); and the like. Incidentally, a “continuous printing job” means a printing job in which images are continuously formed on a single sheet P, or multiple sheets P, of transfer medium, in response to a single image formation start signal.

4. Lubricational Toner Delivery Operation

Figure 6:
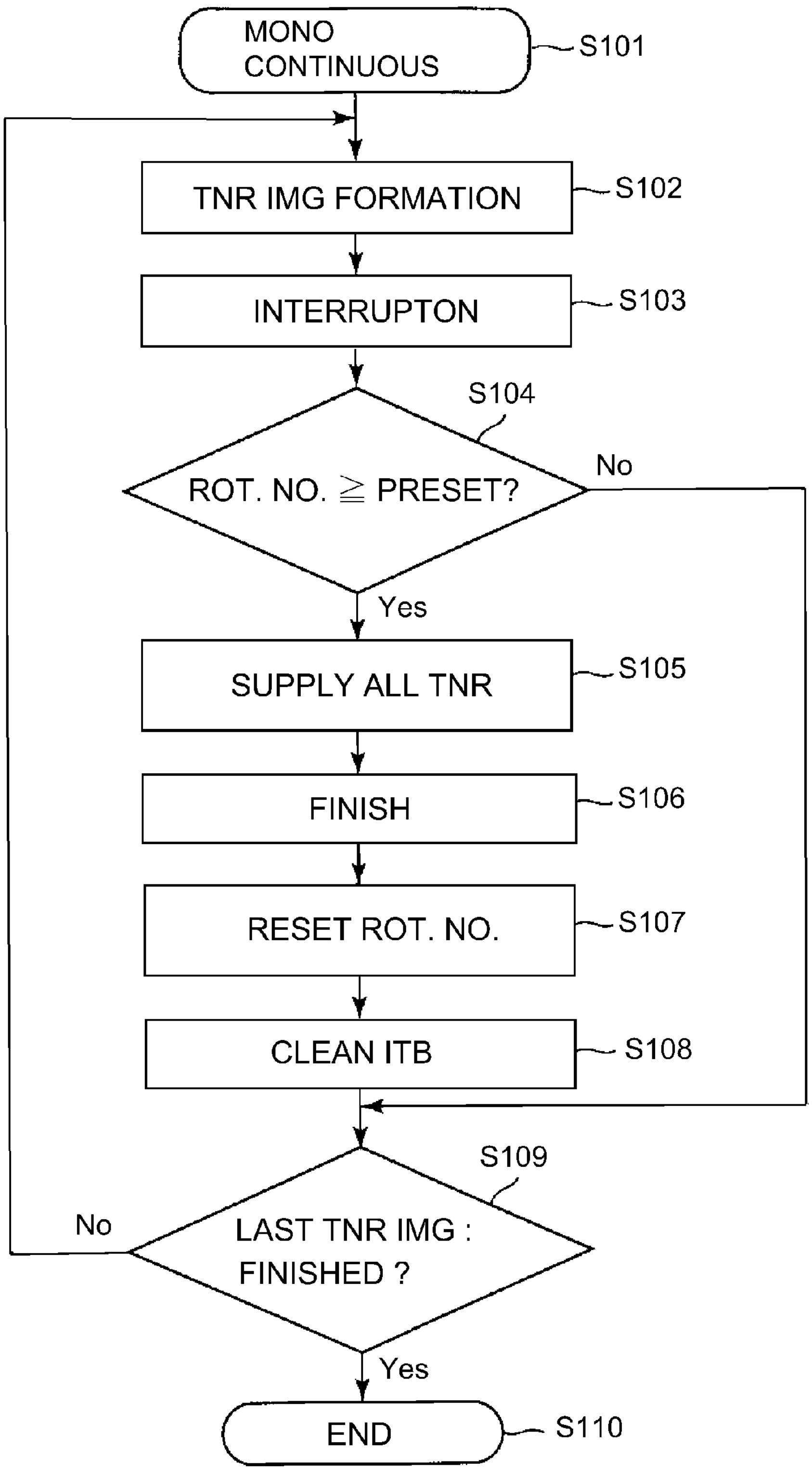
FIG. 6 is a flowchart for describing the lubricational toner delivery operation in the first embodiment.

Next, referring to the flowchart in FIG. 6, the control carried out in a case where the operation carried out during paper intervals in a continuous printing job, or after the printing of the last page of a job, to supply the photosensitive drums 1 with lubricational toner, is described.

As the start signal for a continuous printing job in the monochromatic mode is inputted into the CPU 151, the CPU 151 makes the image forming apparatus 100 to start the continuous printing job (S101).

In the image forming operation in the monochromatic (black-and-white) mode, the above described charging, exposing, developing, primary transferring, and secondary transferring processes, etc., are sequentially carried out, with only one (55K, for example) of the primary transfer rollers 55 being kept pressed against the corresponding photosensitive drum (1K, for example) (S102).

As it becomes time for a paper interval during a continuous monochromatic printing job, the CPU 151 temporarily interrupts the on-going toner image forming operation (S103).

As the on-going image forming operation is interrupted, the CPU 151 reads the value stored in the rotation counter 160, that is, the number of times the photosensitive drums 1Y, 1M, 1C and 1K were rotated since the beginning of the operation. Then, the CPU 151 decides whether or not the value in the rotation counter 160, that is, the number of times the photosensitive drums 1 were rotationally driven, has reached a preset value (threshold value) in the ROM 152 (S104).

If the CPU determines that the number of times the photosensitive drums 1 have been rotational driven has reached the preset value in Step S104 (“Yes”), the CPU makes the image forming apparatus 100 extend the paper interval, and start lubricational toner delivery operation (S105).

Figure 7:
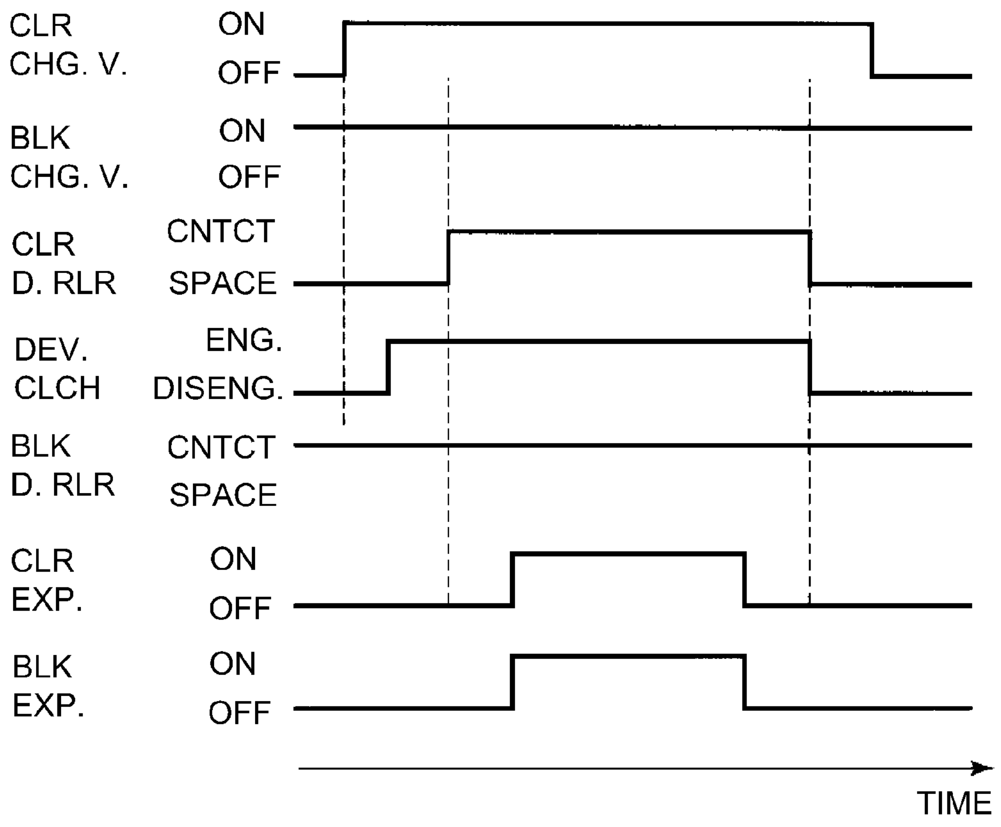
FIG. 7 is a timing chart of an example of lubricational toner delivery operation.

Referring again to FIG. 4, the procedure for supplying the photosensitive drums 1 with lubricational toner is concretely described. By the way, FIG. 7 is a timing chart for the procedure for supplying the photosensitive drums 1 with lubricational toner. First, while the image forming apparatus 100 is in the state shown in FIG. 4(*b*), that is, while the primary transfer roller 55K is kept pressed against the photosensitive drum 1K, the charge voltage power sources E1Y, E1M and E1C, which are for yellow, magenta and cyan color components, respectively, are turned on, whereby charge bias begins to be applied to all the charge rollers 2Y, 2M, 2C and 2K by the charge bias power sources E1Y, E1M and E1C, and the charge bias power source E1K which has been already turned on, respectively, to charge the charge rollers 2Y, 2M, 2C and 2K. Next, the developing means clutch C1 is engaged to start rotating the development rollers 41Y, 41M and 41C for yellow, magenta, and cyan color components, respectively. Then, the development rollers 41Y, 41M and 41C are placed in contact with the photosensitive drums 1Y, 1M and 1C for yellow, magenta and cyan color components, respectively. Thus, the image forming apparatus 100 becomes ready for supplying the photosensitive drums 1Y, 1M, 1C and 1K with lubricational toner as shown in FIG. 4(*c*). Next, an electrostatic latent image for supplying a photosensitive drum 1 with lubricational toner is formed on all the photosensitive drums 1, with the use of the exposing device 3. These electrostatic latent images are in the form of a long and narrow parallelepiped, the dimension of which in terms of the lengthwise direction (parallel to rotational axis) of the photosensitive drum 1 is equal to the length of the photosensitive drum 1, and the dimension of which in terms of the transfer medium conveyance direction (moving direction of peripheral surface of photosensitive drum 1) is proportional to a preset amount by which the photosensitive drum 1 is to be supplied with lubricational toner. Lastly, the above described electrostatic latent image on each photosensitive drum 1 is developed by the corresponding developing device 4 to form a lubricational toner image on the peripheral surface of each photosensitive drum 1, to supply the peripheral surface of each photosensitive drum 1 with a preset amount of lubricational toner.

In an image forming operation in the monochromatic (black-and-white) mode, the charge bias power sources E1Y, E1M and E1C remain turned off, and therefore, the peripheral surface of each of the photosensitive drums 1Y, 1M and 1C will have attenuated in potential (in terms of absolute value), and will be unstable in potential level. Thus, charging and exposing each photosensitive drum 1 as in this embodiment is beneficial from the standpoint of keeping stable the amount (preset amount) by which the peripheral surface of each of the photosensitive drums 1Y, 1M and 1C for yellow, magenta and cyan color components, respectively, is supplied with lubricational toner, regardless of the length of time the development rollers 41Y, 41M and 41C are kept in contact with, or kept separated from, the photosensitive drums 1Y, 1M and 1C, respectively. However, this embodiment is not intended to limit the present invention in terms of the operation for supplying the peripheral surface of each photosensitive drum 1 with lubricational toner. For example, during the above described operation, the exposing process may be carried out while keeping turned off the charge bias power sources E1Y, E1M and E1C for yellow, magenta, and cyan color components, respectively. In such a case, the potential of the peripheral surface of each of the photosensitive drums 1Y, 1M and 1C for yellow, magenta, and cyan color components, respectively, will have attenuated as described above. Therefore, the amount by which lubricational toner is to be supplied has be to slightly increased relative to a theoretically correct amount, according to the changes in the length of time the development rollers 41Y, 41M and 41C are kept in contact with, or kept separated from, the photosensitive drums 1Y, 1M and 1C for yellow, magenta and cyan color components, respectively. However, in terms of the role of toner as lubricant, as long as the amount of toner per unit area of the peripheral surface of the photosensitive drum 1 is greater than a certain value, toner is effective as lubricant regardless of the amount. Therefore, even the above-described modified version of the operation, in this embodiment, for supplying the peripheral surface of a photosensitive drum 1 with lubricational toner, is just as effective as the operation in this embodiment.

After the peripheral surface of each of the four photosensitive drums 1 is supplied with a preset amount of lubricational toner, the CPU 151 separates the development rollers 41Y, 41M and 41C for yellow, magenta and cyan color components, respectively, from the photosensitive drums 1Y, 1M and 1C for yellow, magenta and cyan color components, respectively, with the use of the development roller separating mechanism 30. At the same time, the CPU 151 disengages the development means clutch C1 to stop the rotation of the development rollers 41Y, 41M and 41C for yellow, magenta and cyan color components, respectively, and then, turns off the charge bias power sources E1Y, E1M and E1C for yellow, magenta and cyan color components, respectively. Thus, the image forming apparatus 100 reverts in state as shown in FIG. 4(*b*), in which only the primary transfer roller 55K is kept pressed against the corresponding photosensitive drum. This concludes the lubricational toner delivery operation (S106).

By the way, in this embodiment, during a lubricational toner delivery operation, the primary transfer power source E3Y, E3M and E3 for yellow, magenta and cyan color components, respectively, and the primary transfer bias power source E3K for black color component, apply opposite biases from those applied for image formation, to the primary transfer rollers 55Y, 55M, 55C and 55K, respectively. Also in this embodiment, during a lubricational toner delivery operation, all the development bias power sources E2Y, E2M and E2C for yellow, magenta and cyan color components, respectively, and the development bias power source E2K for black color component, are kept turned on, at least during the development of the lubricational electrostatic latent images, to apply to the development rollers 41 the same development biases as those applied during normal image formations.

Next, as soon as the lubricational toner delivery operation is completed, the CPU 151 resets the rotation counter 160 which stores the number of times the photosensitive drums 1Y, 1M and 1C for yellow, magenta and cyan color components, respectively, are rotated during the completed image forming operation in the monochromatic (black-and-white) mode (S107).

Meanwhile, all the photosensitive drums 1 and the intermediary transfer belt 51 are being continuously rotated. During this period, the primary transfer bias power source E3K applies to the primary transfer roller 55K, a bias which is opposite in polarity from the bias to be applied for normal image formations. However, a part of the black toner supplied to the photosensitive drum 1K for black color component adheres to the surface of the intermediary transfer belt 51 due to the presence of adhesive force such as mutual attraction between the toner and intermediary transfer belt 51, which is attributable to physical contact. Then, the toner on the intermediary transfer belt 51 is removed with the use of the toner charging brush 58 (S108).

This ends the paper interval extended for lubricational toner delivery operation. If it has not been finished to form a toner image on the last sheet P of transfer medium in the on-going continuous printing job, the CPU 151 restarts the interrupted image forming operation in the monochromatic (black-and-white) mode (S108).

In a case where the lubricational toner delivery operation is carried out after the formation of a toner image on the last sheet P of transfer medium in the continuous printing job, the CPU 151 simply ends the printing job (S110).

On the other hand, if it is determined in Step S104 that the number of times the photosensitive drums 1 have been rotated has not reached a preset value ("No"), the job is continued until the last page of the printing job is finished (S109), unless it is determined that the last page of the printing job has been finished. Then, the on-going printing job is ended after the toner image is formed on the last sheet P of transfer medium in the on-going printing job (S110).

As described above, this embodiment can prevent the problem that as an electrophotographic image forming apparatus is continuously operated in the monochromatic (black-and-white) mode, the peripheral surface of each of the photosensitive drums 1Y, 1M and 1C for yellow, magenta and cyan color components, respectively, runs out of toner (lubricational toner). Further, this embodiment can also prevent the problem that the photosensitive drum 1K for black color component runs out of toner (lubricational toner). More specifically, even in an image forming apparatus which is being operated in the monochromatic (black-and-white) mode, as a substantial number of images which are extremely low in print ratio are continuously formed, it sometimes occurs that the peripheral surface of the photosensitive drum 1K for black color component runs out of lubricational toner like the peripheral surfaces of the photosensitive drums 1Y, 1M and 1C of yellow, magenta and cyan color components, respectively, run out of lubricational toner when they are not used for image formation. In this embodiment, however, even the peripheral surface of the photosensitive drum 1K for black color component is supplied with lubricational toner. Therefore, it is possible to prevent the problem that the peripheral surface of the photosensitive drum 1K for black color component runs out of lubricational toner like the peripheral surfaces of the photosensitive drums 1Y, 1M and 1C for yellow, magenta and cyan color components, respectively.

In comparison to a conventional image forming apparatus structure, in which the intermediary transfer belt 51 is kept in contact with all the photosensitive drums during a lubricational toner delivery operation, the image forming apparatus structure in this embodiment is advantageous in that the latter is shorter in the length of time an image forming operation has to be interrupted for a lubricational toner delivery operation. That is, in a case where the intermediary transfer belt 51 is kept in contact with all the photosensitive drums 1 while a lubricational toner delivery operation is carried out, lubricational toner adheres to a wide range of the surface of the intermediary transfer belt 51, in terms of the circumferential direction of the intermediary transfer belt 51. Thus, the distance by which the intermediary transfer belt 51 is circularly moved for cleaning is longer, and therefore, is greater in the length of time necessary to clean the intermediary transfer belt 51. In comparison, in this embodiment, in the monochromatic (black-and-white) mode, among the multiple photosensitive drums 1, only the photosensitive drum 1K, which is the most downstream one in terms of the moving direction of the intermediary transfer belt 51, is kept in contact with the intermediary transfer belt 51. Therefore, the portion of the intermediary transfer belt 51, to which lubricational toner adheres, is limited to the portion of the intermediary transfer belt 51, which is in the adjacencies of the intermediary transferring member cleaning member. Thus, the present invention is advantageous over the prior art in that it can reduce the length of time an image forming operation has to be interrupted for a lubricational toner delivery operation, whether the intermediary transfer belt 51 is cleaned by an electrostatic rotational cleaning means or a cleaning blade.

5. Lubricational Toner Delivery Timing

Next, the method for setting the timing with which a lubricational toner delivery operation is to be initiated, based on the number of rotations of the photosensitive drum 1, is described.

Figure 8:
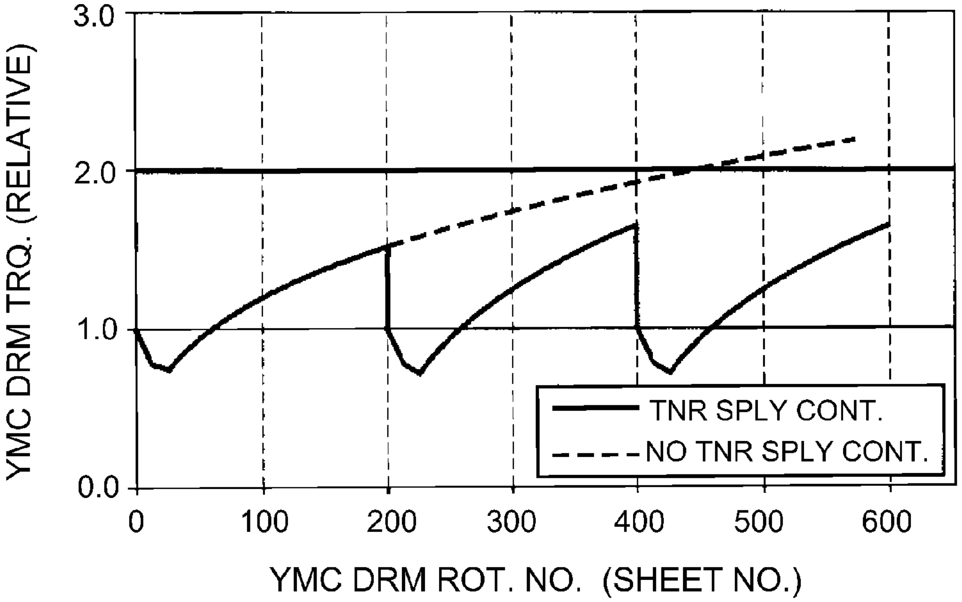
FIG. 8 is a graph for describing the timing and effects of the lubricational toner delivery operation.

FIG. 8 shows the changes in the amount of torque required of the drum shaft of each of the photosensitive drums 1Y, 1M and 1C for yellow, magenta and cyan color components, respectively, which occur in the monochromatic (black-and-white) mode. The value given as the amount of torque is a relative value to the normal amount of torque. In durability tests carried out in the monochromatic (black-and-white) mode, as the peripheral surface of the photosensitive drum 1 runs short of lubricational toner, friction increases between the cleaning blades 61Y, 61M and 61C for yellow, magenta and cyan color components, respectively, and the surfaces of the photosensitive drums 1Y, 1M and 1C, respectively, which in turn increases the amount of torque which the drum shaft requires. It has been known that in the case of the structural arrangement in this embodiment, as the amount of torque which the drum shaft requires becomes roughly twice the normal amount of torque, it becomes highly likely for the cleaning blade 61 to partially break off, and/or turned. Also in this embodiment, in view of the pre-measured rate at which the amount of torque which the drum shaft requires increases, the number of rotations of the photosensitive drum 1, at which the amount of torque which the drum shaft requires becomes roughly 1.8 times the normal amount of torque, was set as a threshold value, which is stored in the ROM 152 in the image forming apparatus 110, and is used in Step S104 (FIG. 6) in the abovementioned control flowchart. In an actual printing operation in the monochromatic (black-and-white) mode, each time the number of rotations of the photosensitive drums 1Y, 1M and 1C reaches the threshold value determined with the use of the above described method, a lubricational toner delivery operation is carried out, as described above. Thus, the number of times the photosensitive drum 1 can be rotated before a lubricational toner delivery operation has to be carried out can be maximized while keeping satisfactorily small, the amount of torque which the drum shaft requires. That is, it is possible to minimize the frequency with which an image forming operation has to be interrupted for a lubricational toner delivery operation, while satisfactorily preventing the problem that the cleaning blade 61 is partially broken off and/or turned.

6. Amount by while Lubricational Toner is to be Delivered

Next, the amount by which lubricational toner is to be delivered is described.

If the peripheral surface of the photosensitive drum 1 is insufficiently supplied with the lubricational toner during a lubricational toner delivery operation, it is possible that the peripheral surface of the photosensitive drum 1 will run out of lubricational toner. Therefore, it is possible that the friction between the cleaning blade 61 and the peripheral surface of the photosensitive drum 1 will not be sufficiently reduced. On the other hand, if the amount by which the lubricational toner is delivered is excessive, the yellow, magenta and cyan toners, which are not being used in the monochromatic (black-and-white) mode, are wastefully consumed.

In this embodiment, therefore, if the amount of torque which the shaft of a given photosensitive drum 1 becomes roughly 1.8 times the normal amount, the amount of torque required by this photosensitive drum 1 is measured to estimate the necessary amount of lubricational toner, immediately after the completion of the lubricational toner supply operation. Then, the following lubricational toner delivery operation is carried out so that the lubricational toner is delivered by the estimated amount.

More specifically, the required amount of lubricational toner is estimated, using the dimension (in terms of moving direction of peripheral surface of photosensitive drum 1) of the toner image formed on the peripheral surface of the photosensitive drum 1 to supply the peripheral surface of the photosensitive drum 1 with lubricational toner, as a parameter. As for the dimension of the lubricational toner image, in terms of the lengthwise direction of the photosensitive drum 1 (direction of rotational axis of photosensitive drum 1), the lubricational toner image is made long enough to cover the entire range of the photosensitive drum 1, across which images can be formed. From the standpoint of ensuring that the peripheral surface of the photosensitive drum 1 is supplied with lubricational toner, across the entirety of the peripheral surface of the photosensitive drum 1 in terms of the lengthwise direction of the cleaning blade 61, in order to reduce the friction between the peripheral surface of the photosensitive drum 1 and the cleaning blade 61, a lubricational toner image is desired to be formed in such a dimension that it extends across the entirety of the image formation area of the peripheral surface of the photosensitive drum 1, in terms of the lengthwise direction of the photosensitive drum 1. However, this embodiment is not intended to limit the present invention in terms of the size and shape of the lubricational toner image. That is, all that is required of a lubricational toner image is that its size and shape are such that it can satisfactorily reduce the friction.

Figure 9:
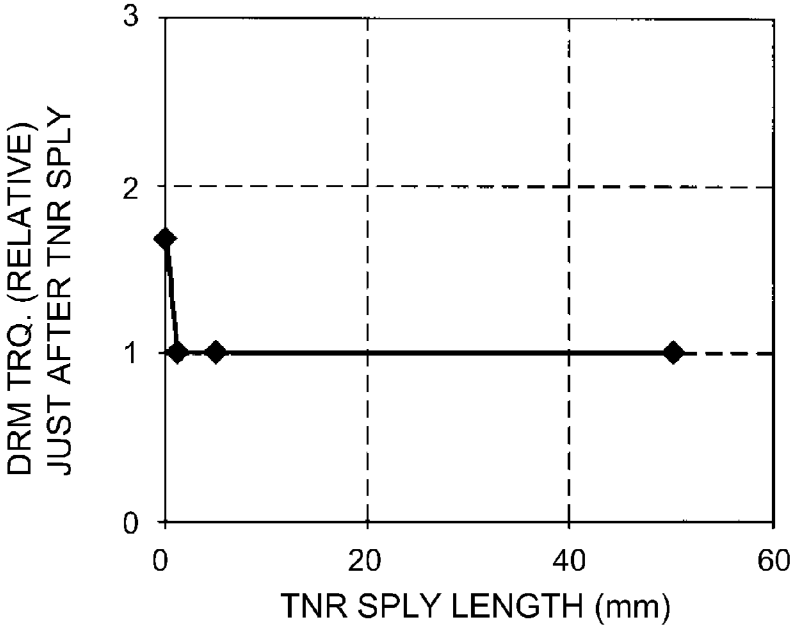
FIG. 9 is a graph for describing the amount by which lubricational toner is delivered in the lubricational toner delivery operation.

FIG. 9 shows the amount of torque required of the drum shaft immediately after the completion of a lubricational toner delivery operation, when the dimension of the lubricational toner image, in terms of the moving direction of the peripheral surface of the photosensitive drum 1, was 1 mm, 5 mm and 50 mm. In this experiment, a lubricational toner delivery operation was carried out as the amount of torque required of a give drum shaft increased to roughly 1.8 times the normal amount. Consequently, the amount of torque required of a drum shaft recovered to the normal value regardless of the width of the lubricational toner image. That is, according to this experiment, the width of the lubricational toner has only to be roughly 1 mm. From the standpoint of minimizing toner consumption for lubrication, the smaller the width of the lubricational toner image, the better. In this embodiment, therefore, the lubricational toner image width was set to 5 mm, in consideration of margin of error. As will be evident from the results of the above described experiment, the effectiveness of toner as lubricant for reducing the amount of torque required of a drum shaft is not exactly related to the amount by which toner is delivered as lubricant to the peripheral surface of a photosensitive drum 1. That is, it is only until the amount by which lubricational toner is delivered to the peripheral surface of a photosensitive drum 1 reaches a certain value, that the greater the amount by which toner is delivered as lubricant to the peripheral surface of a photosensitive drum 1, the more effective the toner as the lubricant for reducing the amount of torque required of the drum shaft (saturation value). Therefore, the amount by which lubricational toner is to be delivered to the peripheral surface of the photosensitive drum can be set to a value close to the saturation value. By setting the amount by which lubricational toner is to be delivered to the peripheral surface of a photosensitive drum, to a value close the saturation value, it is possible to minimize the toner consumption for lubrication, while satisfactorily preventing cleaning blade 61 from being chipped and/or turned.

FIG. 8 shows the results of experiments in which how the amount of torque required of the drum shaft of each of the photosensitive drums 1Y, 1M and 1C for yellow, magenta and cyan color components, respectively, changed when lubricational toner delivery operations are carried out, and not carried out, by the image forming apparatus in this embodiment, during continuous printing operations in which sheets P of transfer medium were LTR in size. Referring to FIG. 8, in the case where the lubricational toner delivery operation is not carried out (dotted line), the amount of torque required of the drum shaft after the roughly 450 prints were completed, became roughly twice the amount of torque required of the drum shaft immediately after the completion of a lubricational toner delivery operation. Further, the cleaning failure attributable to the chipping of the cleaning blade 61 sometimes occurred. In comparison, in the case where the lubricational toner delivery operations were carried out (solid line), the amount of torque (drum shaft torque) remained in the range in which chipping and/or turning of the cleaning blade 61 are unlikely to occur. That is, it was confirmed that carrying out the lubricational toner delivery operation can remarkably reduce the likelihood that the cleaning failure will occur.

As described above, in this embodiment, image forming apparatus 100 has: multiple rotatably image bearing members 1, on which an electrostatic image is formed; and multiple developing devices 41, which are positioned to oppose the multiple image bearing members, one for one, and develop the electrostatic image on the image bearing member, into a toner image. Further, the image forming apparatus 100 has the transfer belt 51 which is circularly movable in the direction in which the multiple image bearing members are aligned in parallel, and onto which the toner image is directly transferred from the image bearing member which is in contact with the transfer belt 51. Further, the image forming apparatus 100 has multiple cleaning members 61, which are disposed in contact with the multiple image bearing members 1, one for one, to remove the toner on the peripheral surface of the image bearing member 1. The image forming apparatus 100 can be operated in the monochromatic (black-and-white) mode, which is one of the operational modes in which the apparatus 100 can be operated. In the monochromatic (black-and-white) mode, a toner image to be transferred onto a sheet P of transfer medium, is formed on only one, or two or more (one in this embodiment), among the multiple image bearing members, and no toner image is formed on the other image bearing members 1Y, 1M and 1C among the multiple image bearing members. Also, the image forming apparatus 100 in this embodiment has: the common driving force source M1 which rotationally drives the multiple image bearing members 1 in synchronism; and the control portion 150. In the monochromatic (black-and-white) mode, the control portion 150 makes the image forming apparatus 100 carry out the lubricational toner delivery operation in such a manner that at least the image bearing members 1Y, 1M and 1C, on which toner images are not formed to be transferred onto a sheet P of transfer medium, are supplied with lubricational toner from the development rollers 41Y, 41M and 41C.

Further, in this embodiment, the image forming apparatus 100 has a separating device 20 which separates and keeps separated the intermediary transfer belt 51 from at least the image bearing members 1Y, 1M and 1C, among the multiple image bearing members, on which toner images to be outputted are not formed in the above described image formation mode. In particular, in this embodiment, the lubricational toner delivery operation is carried out for all of the multiple image bearing members during the above described image formation mode. Also in this embodiment, the image forming apparatus 100 has the moving device 30 for moving the above described developing devices to the first or second position in which the developing devices are relatively close to, or farther from, respectively, the image bearing members on which toner image to be outputted is not formed in the above described image formation mode. More specifically, this developing device moving device moves the developing devices to the second position, before the image forming apparatus 100 begins to be operated in the above descried image formation mode. Further, it moves the developing devices to the first position, when the lubricational toner delivery operation has to be carried out while the image forming apparatus 100 is operated in the above described image formation mode. Also in this embodiment, the image forming apparatus 100 has the detecting device 160 which detects the information related to the amount by which the image forming apparatus 100 was operated in the above-described image formation mode. The controlling device 151 makes the image forming apparatus 100 carry out the lubricational toner delivery operation as the result of the detection by the detecting device 160 reaches a preset value.

As described above, in this embodiment, image forming apparatus 100 always rotationally drive in synchronism all the photosensitive drums 1 (for all color components, one for one) by the motor M1, and can be operated in the monochromatic (black-and-white) mode in which images are formed only in the image forming portion for a specific (selected) color, for example, black color. Even though the image forming apparatus 100 is structured as described above, it can prevent the problem that in the monochromatic (black-and-white) mode, the cleaning blades 61 for the photosensitive drums 1 in the image forming portions, in which no image is formed during the monochromatic (black-and-white) mode, are chipped and/or turned, which results in cleaning failure.

[Embodiment 2]

Next, another embodiment of the present invention is described. The basic structure and operation of the image forming apparatus are the same as those of the image forming apparatus in the first embodiment. Therefore, the elements of the image forming apparatus in this embodiment, which are the same as, or equivalent to, the counterparts in the image forming apparatus in this first embodiment, are given the same referential codes, one for one, as those given to the counterparts, and are not described in detail here.

This embodiment is different from the first embodiment in that in this embodiment, only the photosensitive drums 1Y, 1M and 1C for yellow, magenta, and cyan color components, respectively, are supplied with lubricational toner, in the monochromatic (black-and-white) mode. That is, in this embodiment, it is during an image forming operation in the monochromatic (black-and-white) mode in which images are formed on the photosensitive drum 1K for black color component that the lubricational toner delivery operation for supplying the peripheral surfaces of the photosensitive drums 1Y, 1M and 1C for yellow, magenta and cyan color components, respectively, is started and/or ended.

That is, the operation for supplying the photosensitive drums 1Y, 1M and 1C for yellow, magenta, and cyan color components, respectively, with lubricational toner is carried out when the photosensitive drums 1Y, 1M and 1C are not in contact with the intermediary transfer belt 51. Therefore, the lubricational toner delivery operation does not have any effect upon the intermediary transfer belt 51. Therefore, a monochromatic image forming operation which uses the photosensitive drum 1K for black color component can be continued in parallel to the operation in which the photosensitive drums 1Y, 1M and 1C are supplied with lubricational toner.

Figure 10:
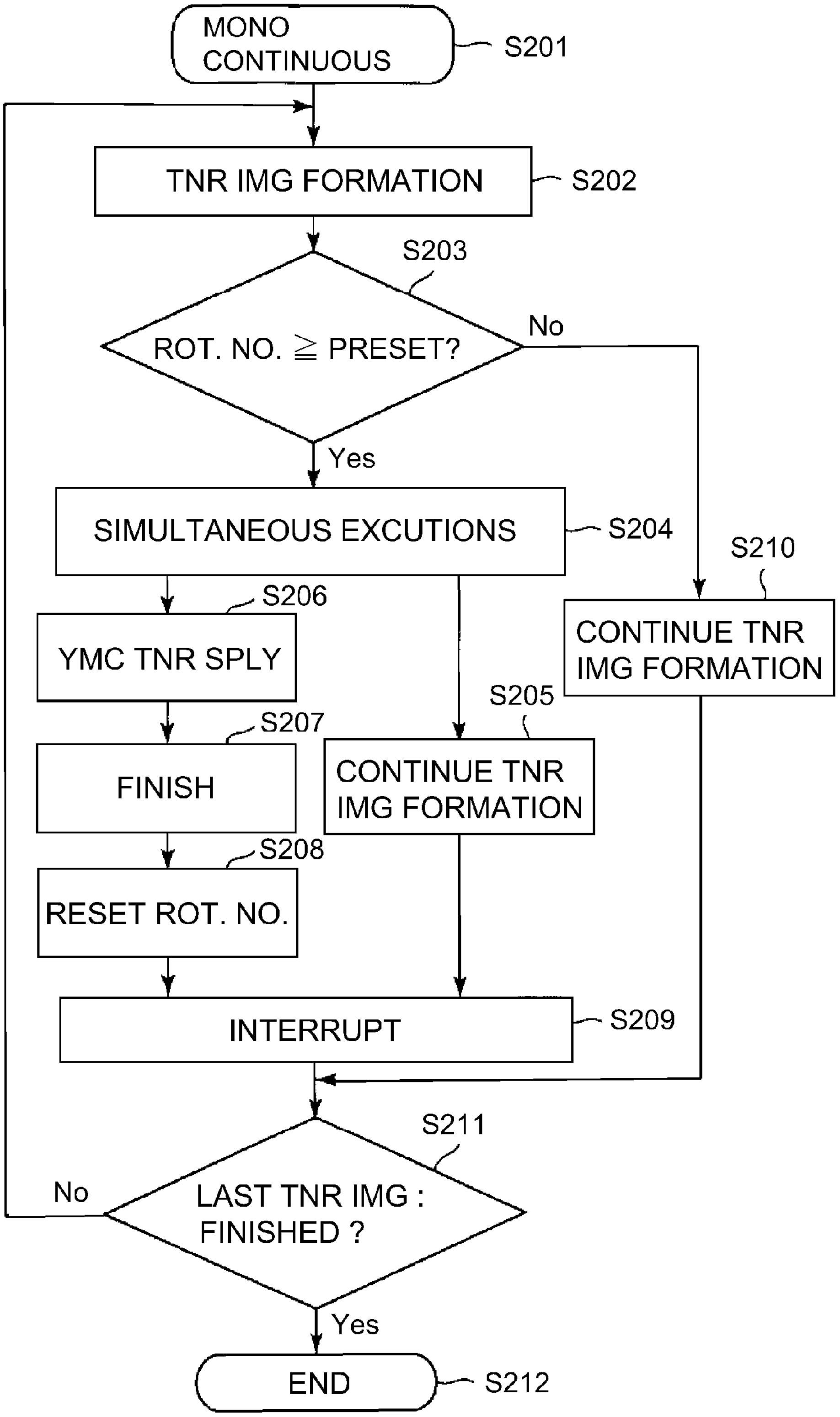
FIG. 10 is a flowchart for describing the lubricational toner delivery operation in another embodiment of the present invention.

Next, referring to the flowchart in FIG. 10, a case in which a lubricational toner delivery operation is carried out during a continuous printing job is described. In this embodiment, the number of revolutions of the photosensitive drums 1Y, 1M and 1C for yellow, magenta and cyan color components, respectively, are detected for each sheet P of transfer medium used for image formation. Further, the timing with which the lubricational toner delivery operation is started is set so that the operation is started while images are formed in the monochromatic (black-and-white) mode in which the photosensitive drum 1K for black color component is used.

First, as an instruction for starting a continuous printing job in the monochromatic (black-and-white) mode is inputted, the CPU 151 makes the image forming apparatus 100 start the continuous printing job (S201).

The image forming operation carried out in the monochromatic (black-and-white) mode by the image forming apparatus 100 in this embodiment is the same as the one carried out by the image forming apparatus 100 in the first embodiment.

That is, it comprises the same charging, exposing, developing, primary transferring, secondary transferring processes, etc., as those of the image forming operation carried out in the monochromatic (black-and-white) mode by the image forming apparatus in the first embodiment, in which the intermediary transfer belt 51 is kept in contact with only one of the multiple image bearing members 1 as shown in FIG. 4(*b*) (S202).

After the CPU 150 begins the continuous printing job in the monochromatic (black-and-white) mode, it reads the value in the rotation counter 160 in which the number of times the photosensitive drums 1Y, 1M and 1C have been rotated in the monochromatic (black-and-white) mode is stored, at the same time as toner images begin to be formed with the use of the photosensitive drum 1K for black color component. Then, the CPU 150 decides whether the value has reached the preset one stored in advance in the ROM 152 (S203).

If the CPU 151 determines that the value has reached the preset one ("Yes") in S203, it makes the image forming apparatus 100 perform an operation such as the following one (S204). That is, the CPU 151 makes the image forming apparatus 100 start supplying the photosensitive drums 1Y, 1M and 1C for yellow, magenta, and cyan color components, respectively, with lubricational toner (S206) while continuing the on-going image forming operation in the monochromatic (black-and-white) mode, in which only the photosensitive drum 1K for black color components is used (S205).

Referring again to FIG. 4, the procedure carried out by the image forming apparatus in this embodiment to supply the photosensitive drums 1Y, 1M and 1C with lubricational toner is concretely described. First, while the intermediary transfer belt 51 is kept in contact with only a single image bearing member (photosensitive drum 1K, for example) as shown in FIG. 4(*b*), the charge bias power sources E1Y, E1M and E1C are turned on to start applying charge bias to the charge rollers 2Y, 2M and 2C for yellow, magenta, and cyan color components, respectively, to charge the photosensitive drums 1Y, 1M and 1C. Next, the CPU 151 begins to rotate the development rollers 41Y, 41M and 41C for yellow, magenta and cyan color components, respectively, and places the development rollers 41Y, 41M and 41C in contact with the photosensitive drums 1Y, 1M and 1C, respectively, to put the image forming apparatus in the state, shown in FIG. 4(*c*), in which the photosensitive drums 1Y, 1M and 1C can be supplied with lubricational toner, as in the first embodiment. Next, the CPU 151 forms electrostatic latent images for forming lubricational toner images, on the peripheral surfaces of the photosensitive drums 1Y, 1M and 1C, with the use of the exposing device 3, as in the first embodiment. Lastly, the CPU 151 develops the electrostatic latent images for lubrication formed on the photosensitive drums 1Y, 1M and 1C, one for one, with the use of the developing devices 4Y, 4M and 4C, respectively, to provide the peripheral surfaces of the photosensitive drums 1Y, 1M and 1C with lubricational toner.

As the photosensitive drums 1Y, 1M and 1C for yellow, magenta, and cyan color components, respectively, are supplied with the preset amount of lubricational toner, the CPU 151 puts the image forming apparatus in the state shown in FIG. 4(*b*) in which the intermediary transfer belt 51 is in contact with only one image bearing member (photosensitive drum 1K), through the same procedures as that in the first embodiment, ending thereby the lubricational toner delivery operation (S207). Further, as the CPU 150 completes the lubrication toner delivery operation, it resets (to zero) the rotation counter 160 in which the number of times the photosensitive drums 1Y, 1M and 1C have been rotated in the image forming operation in the monochromatic (black-and-white) mode before the lubricational toner delivery operation was ended was stored (S208).

As the CPU 151 ends the toner image forming operation which has been carried out in the monochromatic mode in parallel to the lubricational toner delivery operation, it moves to the operation for forming the toner image for the next page (S209, S211).

In a case where the lubricational toner delivery operation is carried out after the toner image formation on the last page, the control portion 150 makes the image forming apparatus simply end the printing job (S212).

Further, if the CPU 151 determines in S203 that the value in the rotation counter 160 has not reached the preset one ("No"), it makes the image forming apparatus continue the on-going printing job until the last page is outputted, until the value in the rotation counter 160 reaches the preset one. Then, it makes the image forming apparatus end the on-going printing job after the toner image formation on the last page (S212).

As described above, in this embodiment, the lubricational toner delivery operation is carried out for the image bearing members 1Y, 1M and 1C, on which toner images to be output are not formed in the preset image formation mode (monochromatic (black-and-white) mode), while toner images to be outputted are being formed on the preset image bearing member 1K in the monochromatic (black-and-white) mode.

As described above, in this embodiment, the lubricational toner delivery operation for supplying the photosensitive drums in the image forming portions in which images are not being formed in the monochromatic (black-and-white) mode, is carried out while image are formed in monochromatic (black-and-white) mode, in the image forming portion for black color component, for example. Therefore, not only can this embodiment provide the same effects as the first embodiment, but also, can minimize the length of time the normal image forming operation cannot be carried out because the lubricational toner delivery operation has to be carried out. Incidentally, the lubricational toner delivery operation for supplying the image forming portions in which images are not being formed in the monochromatic (black-and-white) mode, with lubricational toner, may be carried out while the exposing device 3 is kept inactive. Further, the toner which adheres to the surfaces of the photosensitive drums 1Y, 1M and 1C when the developing devices 4Y, 4M and 4C for yellow, magenta and cyan color components, respectively, which have been kept separated from the photosensitive drums 1Y, 1M and 1C, are placed in contact with the photosensitive drums 1Y, 1M and 1C, respectively, may be utilized as lubricational toner.

[Miscellaneous Embodiments]

In the forgoing, the present invention was concretely described with reference to embodiments of the present invention. However, these embodiments are not intended to limit the present invention in scope.

For example, in the preceding embodiments, in the monochromatic (black-and-white) mode in which the photosensitive drum for black color component was used, the lubricational toner delivery operation was carried out for the photosensitive drums for all color components, or the photosensitive drums for actual color components (yellow, magenta and cyan color components). These embodiments are not intended to limit the present invention in scope in terms of which photosensitive drum should be in use for monochromatic image formation when lubricational toner delivery operation is carried out. That is, even in the case where the photosensitive drum used in the monochromatic (black-and-white) mode is for other color components than black color component, the same effects can be obtained with the use of the same structure and mechanism. Further, the preceding embodiments are not intended to limit the present invention to only a single image forming portion in terms of the number of image forming portions to be used for image formation. That is, the present invention is also applicable to image forming apparatuses structured so that the lubricational toner delivery operation can be carried out while images are formed in two or more image forming portions.

Further, even in the case of image forming apparatuses structured so that the lubricational toner delivery operation is carried out during a sheet interval, the lubricational toner delivery operation may be carried out only in the image forming portions for yellow, magenta and cyan color components, respectively, in which toner images are not formed in a preset image formation mode such as the monochromatic (black-and-white) mode.

Further, in the above-described embodiments, the information related to the amount of operation in a preset image formation mode such as the monochromatic (black-and-white) mode was the number of rotations of the photosensitive drum 1. However, these embodiments are not intended to limit the present invention in terms of the amount of operation in the preset image formation. That is, all that is necessary is to what extent (rotation) the photosensitive drums on which toner images are not formed in the preset image formation mode (monochromatic (black-and-white) mode was used while no image was formed thereon. For example, the information may be the length of time a photosensitive drum is rotated, image formation count, or the like.

Further, in the above-described embodiments, the image forming apparatuses were structured so that the development rollers 41 are placed in contact with the photosensitive drums 1. However, the present invention can also be applied to image forming apparatuses structured so that a preset amount gap is maintained between the development roller 41 and image bearing members even during development. In such a case, image forming apparatuses may be structured so that it is when development rollers are positioned closer to image bearing members that the image bearing members are supplied with toner; image bearing members are not supplied with toner when the development rollers 41 are positioned farther from the image bearing members.

Further, the mechanism for moving the development rollers 41 may be structured so that the multiple developing devices can be individually moved, or moved together, to a position in which they are close to the image bearing members, or a position in which they are farther from the image bearing members. Similarly, in the above-described embodiments, the separating device was structured so that the multiple primary transferring members were moved together away from the photosensitive drums to separate the intermediary transfer belt 51 from the photosensitive drums. However, the separating device may be structured so that the primary transfer members can be individually separated from the corresponding photosensitive drum.

Figure 11:
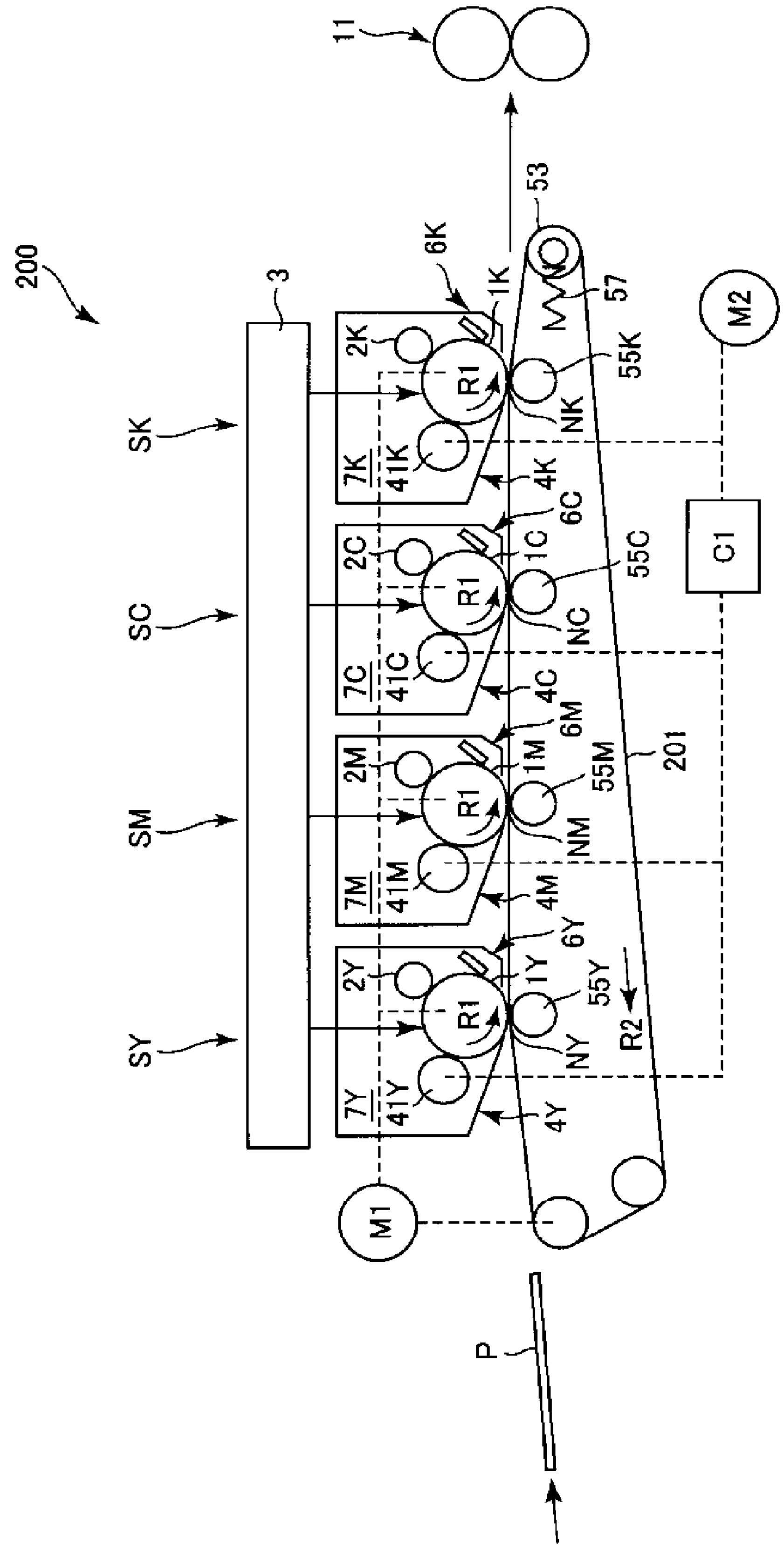
FIG. 11 is a schematic sectional view of the essential portions of another image forming apparatus to which the present invention is applicable.

Also in the above-described embodiments, the image forming apparatuses were of the intermediary transfer type. However, the present invention is also applicable to image forming apparatuses of the direct transfer type, with the same effects as those described above. FIG. 11 is a schematic sectional view of an image forming apparatus 200 of the direct transfer type, and also, of the tandem type. It shows the general structure of the essential portions of the image forming apparatus 200. Regarding the referential codes for the elements of the image forming apparatus 200, the elements of the image forming apparatus 200, which are the same as, or correspondent to, the counterparts of the image forming apparatus 100 in FIG. 1, in function and structure, are given the same referential codes as those given to the counterparts.

The image forming apparatus 200, which is of the direct transfer type, does not have a component which is similar to the intermediary transferring member of the image forming apparatus 100, which is of the intermediary transfer type. Instead, it has a transfer medium bearing belt 201, which is in the form of an endless belt, and bears and conveys a sheet P of transfer medium. The transfer medium bearing belt 201 is a type of transfer belt onto which a toner image is transferred from an image bearing member. The transfer medium conveying belt 201 conveys the sheet P of transfer medium, while keeping the sheet P electrostatically adhered thereto, through the image forming portions, in which the toner images formed in the image forming portions are sequentially transferred in layers onto the sheet P of transfer medium. After the transfer of the toner images onto the sheet P of transfer medium, the sheet P is separated from the transfer medium bearing member 201, and is conveyed to the fixing device 11, in which the toner images are fixed to the sheet P. Then, the sheet P is discharged from the image forming apparatus 200.

By the way, the image forming apparatus 200 of the direct transfer type is also provided with a transfer medium bearing member cleaning device for removing the toner images (patches) formed intentionally on the transfer medium bearing member 201 to control the image forming apparatus 200, toner image which was accidentally transferred onto the transfer medium bearing member 201 when paper jam occurred, or the like contaminants. This transfer medium bearing member cleaning device may be structured the same as the intermediary transferring member cleaning device of the image forming apparatus 100 of the intermediary transfer type. Further, the transfer medium bearing member cleaning operation of the image forming apparatus 200 may be similar to the intermediary transferring member cleaning operation of the image forming apparatus 100 in the first embodiment. Further, the effects of the application of the present invention to the image forming apparatus 200 of the direct transfer type are similar to those obtained by the image forming apparatuses in the above described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Applications Nos. 090559/2013 and 146907/2013 filed Apr. 23, 2013 and Jul. 12, 2013, respectively, which are hereby incorporated by reference.

What is claimed is:

1. An image forming apparatus comprising:

a plurality of image bearing members;

a plurality of cleaning blades corresponding to said image bearing members, respectively, for removing toner from said corresponding image bearing members;

a plurality of developing devices corresponding to said image bearing members, respectively, for developing an electrostatic latent image on said corresponding image bearing members with toner;

a belt for receiving toner images from said image bearing members and for transferring the toner image onto a transfer material; and a controller for driving said image bearing members, wherein said image forming apparatus is operable in a monochromatic mode in which the toner image is formed only on a predetermined one of said image bearing members, and no image is formed on the other image bearing member;

wherein in an operation in the monochromatic mode, said controller starts to drive said plurality of image bearing members in synchronism with each other in a state that said other image bearing member is spaced from said belt, and said predetermined image bearing member is in contact with said belt, and wherein said controller is capable of executing a supplying operation for supplying the toner from said developing devices to said cleaning blades by way of said image bearing members, respectively.

2. An apparatus according to claim 1, further comprising a common driving source for simultaneously driving said plurality of image bearing members and said belt.

3. An apparatus according to claim 2, wherein in the monochromatic mode, said controller spaces said developing device corresponding to said other image bearing member from said image bearing-member.

4. An apparatus according to claim 1, wherein when the supplying operation to the cleaning blade corresponding to said other image bearing member is executed in operation of the monochromatic mode, said controller executes the supplying operation for all of the image bearing members.

5. An apparatus according to claim 4, further comprising exposure units for exposing said image bearing members, respectively, and charging devices corresponding to said image bearing members, for charging said image bearing members, respectively, wherein when the supplying operation is executed in operation of the monochromatic mode, said controller forms electrostatic latent images by said exposure units on surfaces of said image bearing members charged by said charging devices, and supplies the toner images provided by developing the thus formed electrostatic latent images by the developing devices to said cleaning blades, respectively.

6. An apparatus according to claim 4, wherein in continuous image formations on a plurality of transfer materials in one job, when the supplying operation is executed to said cleaning blade for said other image bearing member, said controller interrupts image formation on the plurality of transfer materials and executes the supplying operation.

7. An apparatus according to claim 1, wherein when the supplying operation is executed for said cleaning blade corresponding to said other image bearing member in operation of the monochromatic mode, said controller executes the supplying operation for said image bearing member while continuing the image formation on the predetermined image bearing member.

8. An apparatus according to claim 7, further comprising exposure units for exposing said image bearing members, and charging devices corresponding to said image bearing members, respectively, for charging corresponding image bearing members, wherein the supplying operation is executed in operation of the monochromatic mode, said controller forms electrostatic latent images by said exposure units on surfaces of the image bearing members charged by said charging devices, and supplies the toner images provided by developing the thus formed electrostatic latent images by said developing devices to said cleaning blades, respectively.

9. An apparatus according to claim 7, further comprising exposure units for exposing said image bearing members, and charging devices corresponding to said image bearing members, respectively, for charging corresponding image bearing members, wherein when the supplying operation is executed in operation of the monochromatic mode, said controller supplies the toner deposited by contacting said developing device to said image bearing member to said cleaning blades, respectively, without effecting charging for said other image bearing member by said charging device and without effecting exposure for said other image bearing member by said exposure unit.

10. An apparatus according to claim 1, wherein said predetermined image bearing member is disposed at a position downstreammost with respect to a moving direction of said belt.

11. An apparatus according to claim 10, wherein said predetermined image bearing member is a photosensitive member for carrying black toner image.

12. An apparatus according to claim 1, further comprising a detecting device for detecting information relating to an operation amount in the monochromatic mode, wherein said controller executes the supplying operation when a detection result of said detecting device reaches a predetermined threshold.

13. An apparatus according to claim 12, wherein the information is a number of rotations of said predetermined image bearing member in the monochromatic mode.

14. An apparatus according to claim 1, wherein said belt is an intermediary transfer belt for transferring the toner image onto the transfer material after the toner image is directly transferred from said image bearing member.

15. An apparatus according to claim 1, wherein said belt is a transfer material carrying belt for carrying and feeding the transfer material for receiving the toner image from said image bearing member.

16. An apparatus according to claim 1, further comprising a plurality of cleaning blades corresponding to said image bearing members, respectively, for removing the toner from the corresponding image bearing members; and a plurality of developing devices corresponding to said image bearing members, respectively, for developing an electrostatic latent image on said image bearing members with toner.

17. An apparatus according to claim 16, wherein in the monochromatic mode, said controller spaces said developing device from said corresponding image bearing-member.

18. An apparatus according to claim 16, wherein said controller is capable of executing a supplying operation for supplying the toner from said developing devices to said cleaning blades by way of said image bearing members, respectively.

19. An apparatus according to claim 16, wherein when the supplying operation to the cleaning blade corresponding to said other image bearing member is executed in operation of the monochromatic mode, said controller executes the supplying operation for all of said image bearing members.

20. An image forming apparatus comprising:

a plurality of image bearing members;

a belt for receiving toner images from said image bearing members and for transferring the toner image onto a transfer material;

a controller for driving said image bearing members; and a common driving motor for simultaneously driving all of the image bearing members, wherein said image forming apparatus is operable in a monochromatic mode in which the toner image is formed only on a predetermined one of said image bearing members, and no image is formed on the other image bearing member;

wherein in operation in the monochromatic mode, said controller controls said common driving motor to start rotation of all of said image bearing members synchronously, in a state that said other image bearing member is spaced from said belt, and said predetermined image bearing member is in contact with said belt.

* * * * *